(12) United States Patent
Josiam et al.

(10) Patent No.: US 12,388,916 B2
(45) Date of Patent: *Aug. 12, 2025

(54) EFFICIENT SIGNALING AND ADDRESSING IN WIRELESS LOCAL AREA NETWORK SYSTEMS

(71) Applicant: Samsung Electronics Co., Ltd., Suwon-si (KR)

(72) Inventors: Kaushik M. Josiam, Fort Worth, TX (US); Rakesh Taori, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

This patent is subject to a terminal disclaimer.

(21) Appl. No.: 17/809,883

(22) Filed: Jun. 29, 2022

(65) Prior Publication Data
US 2022/0345550 A1 Oct. 27, 2022

Related U.S. Application Data

(63) Continuation of application No. 16/806,165, filed on Mar. 2, 2020, now Pat. No. 11,418,633, which is a
(Continued)

(51) Int. Cl.
*H04L 69/22* (2022.01)
*H04B 7/0452* (2017.01)
(Continued)

(52) U.S. Cl.
CPC ........... *H04L 69/22* (2013.01); *H04B 7/0452* (2013.01); *H04L 5/0044* (2013.01);
(Continued)

(58) Field of Classification Search
CPC ... H04L 5/0044; H04L 5/0053; H04L 5/0091; H04L 5/0094; H04L 5/0023; H04L 65/40;
(Continued)

(56) References Cited

U.S. PATENT DOCUMENTS

| | | |
|---|---|---|
| 8,959,554 B2 | 2/2015 | Hwang et al. |
| 9,025,428 B2 | 5/2015 | Jones, IV et al. |

(Continued)

FOREIGN PATENT DOCUMENTS

| | | |
|---|---|---|
| CN | 101350804 A | 1/2009 |
| CN | 101946539 A | 1/2011 |

(Continued)

OTHER PUBLICATIONS

Inoue, IEEE P802.11 Wireless LANs, IEEE 802.11 Task Group ax, Mar. 2015 Berlin Meeting, Estrel Hotel, Berlin, Germany, Mar. 8-13, 2015, 32 pages.

(Continued)

*Primary Examiner* — Noel R Beharry
*Assistant Examiner* — Rodrick Mak

(57) ABSTRACT

Methods and apparatuses for scheduling and indicating scheduling information in a wireless local area network (WLAN). A station (STA) includes a transceiver configured to receive a header for a protocol data unit and a controller configured to identify common information for a plurality of STAs that are scheduled in the WLAN from a common field in the header and to identify user-specific information for the STA from a user-specific field in the header that follows the common field. An access point (AP) includes a controller configured to include common information for a plurality STAs that are scheduled in the WLAN in a common field in a header of a protocol data unit, and to include user-specific information for the STAs in a user-specific field in the header that follows the common field. The AP also includes a transceiver configured to transmit the protocol data unit including the header.

32 Claims, 27 Drawing Sheets

Related U.S. Application Data continuation of application No. 15/090,602, filed on Apr. 4, 2016, now Pat. No. 10,582,025.

(60) Provisional application No. 62/157,344, filed on May 5, 2015, provisional application No. 62/189,654, filed on Jul. 7, 2015, provisional application No. 62/203,457, filed on Aug. 11, 2015, provisional application No. 62/216,514, filed on Sep. 10, 2015.

(51) Int. Cl.
| | |
|---|---|
| *H04L 5/00* | (2006.01) |
| *H04L 27/26* | (2006.01) |
| *H04L 65/40* | (2022.01) |
| *H04W 72/23* | (2023.01) |
| *H04W 84/12* | (2009.01) |

(52) U.S. Cl.
CPC .......... *H04L 5/0053* (2013.01); *H04L 5/0091* (2013.01); *H04L 27/2602* (2013.01); *H04L 65/40* (2013.01); *H04W 72/23* (2023.01); *H04W 84/12* (2013.01)

(58) Field of Classification Search
CPC . H04L 27/2602; H04L 27/2603; H04W 72/23
See application file for complete search history.

(56) References Cited

U.S. PATENT DOCUMENTS

| | | | |
|---|---|---|---|
| 9,313,068 B2 | 4/2016 | Park et al. | |
| 2011/0002290 A1 | 1/2011 | Kim et al. | |
| 2012/0177017 A1 | 7/2012 | Gong et al. | |
| 2012/0177144 A1 | 7/2012 | Lee et al. | |
| 2013/0044743 A1 | 2/2013 | Zhang et al. | |
| 2013/0339516 A1 | 12/2013 | Chauhan et al. | |
| 2014/0307649 A1 | 10/2014 | Vermani et al. | |
| 2014/0369276 A1 | 12/2014 | Porat et al. | |
| 2015/0009894 A1 | 1/2015 | Vermani et al. | |
| 2016/0007374 A1 | 1/2016 | Lee et al. | |
| 2016/0050093 A1 | 2/2016 | Choi et al. | |
| 2016/0066338 A1 | 3/2016 | Kwon et al. | |
| 2016/0072654 A1 | 3/2016 | Choi et al. | |
| 2016/0100408 A1* | 4/2016 | Hedayat | H04L 5/0037 370/329 |
| 2016/0112851 A1* | 4/2016 | Li | H04L 69/22 370/338 |
| 2016/0150505 A1 | 5/2016 | Hedayat | |
| 2016/0165524 A1 | 6/2016 | Kim et al. | |
| 2016/0183276 A1 | 6/2016 | Marinier et al. | |
| 2016/0255610 A1 | 9/2016 | Li et al. | |
| 2016/0316473 A1 | 10/2016 | Wang et al. | |
| 2016/0330715 A1 | 11/2016 | Chen et al. | |
| 2017/0013603 A1 | 1/2017 | Vermani et al. | |
| 2017/0013604 A1 | 1/2017 | Vermani et al. | |
| 2017/0041929 A1 | 2/2017 | Noh et al. | |
| 2017/0048034 A1 | 2/2017 | Bharadwaj et al. | |
| 2017/0048823 A1 | 2/2017 | Bharadwaj et al. | |
| 2017/0048862 A1 | 2/2017 | Choi et al. | |
| 2017/0064718 A1 | 3/2017 | Bharadwaj et al. | |
| 2017/0093546 A1 | 3/2017 | Wu et al. | |
| 2017/0111096 A1 | 4/2017 | Nabetani | |
| 2017/0149523 A1 | 5/2017 | Li et al. | |
| 2018/0063821 A1 | 3/2018 | Huang et al. | |
| 2019/0052353 A1 | 2/2019 | Kim et al. | |
| 2019/0190656 A1 | 6/2019 | Lou et al. | |

FOREIGN PATENT DOCUMENTS

| | | |
|---|---|---|
| CN | 102835061 A | 12/2012 |
| CN | 103379674 A | 10/2013 |
| CN | 103947143 A | 7/2014 |
| CN | 104247436 A | 12/2014 |
| EP | 2996271 A1 | 3/2016 |
| EP | 2996271 A4 | 2/2017 |
| WO | 2014171788 A1 | 10/2014 |
| WO | 2014182065 A1 | 11/2014 |
| WO | 2015016684 A1 | 2/2015 |

OTHER PUBLICATIONS

Stacey, et al., "Proposed TGax draft specification," IEEE P802.11, Wireless LANs, Jan. 15, 2016, 147 pages.
Communication under Rule 71(3) EPC in connection with European Application No. 16789640.6 dated Dec. 11, 2020, 7 pages.
Notice of Preliminary Rejection in connection with Korean Application No. 1020160055124 dated Nov. 5, 2020, 11 pages.
Office Action dated Jun. 3, 2020 in connection with Chinese Patent Application No. 201680039627.5, 24 pages.
European Search Report dated Jun. 11, 2021, in connection with European Patent Application 21164223.6, 8 pages.
Supplementary European Search Report dated Apr. 11, 2018 in connection with European Patent Application No. EP 16 78 9640.
Yasuhiko Inoue, "TGax Mar. 2015 Berlin Meeting Minutes", IEEE, Apr. 1, 2015, 32 pages.
Jianhan Liu et al., "Reliable Dual Sub-Carrier Modulations (DCM) for HE-SIG-B and Data", Sep. 12, 2015, 25 pages.
Shahmaz Azizi et al., "OFDMA Numerology and Structure", Mar. 9, 2015, 38 pages.
IEEE Standard 802.11ac-2013; Part 11: Wireless LAN Medium Access Control (MAC) and Physical Layer (PHY) Specifications Amendment 4; IEEE Computer Society; New York, 425 pages.
International Search Report dated Aug. 19, 2016 in connection with International Application No. PCT/KR2016/004755, 5 pages.
Written Opinion of the International Searching Authority dated Aug. 19, 2016 in connection with International Application No. PCT/KR2016/004755, 5 pages.
Chinese National Intellectual Property Administration, Office Action issued Aug. 9, 2023 regarding Application No. 202111105927.8, 11 pages.
Carstens, "BCCH Handling in Enhanced CELL_FACH", IPCOM000155922D, Aug. 20, 2007, 2 pages.
Extended European Search Report issued Feb. 27, 2023 regarding Application No. 22211592.5, 6 pages.
China National Intellectual Property Administration, Decision to Grant issued Jan. 5, 2024, regarding Application No. 202111105927.8, 7 pages.

* cited by examiner

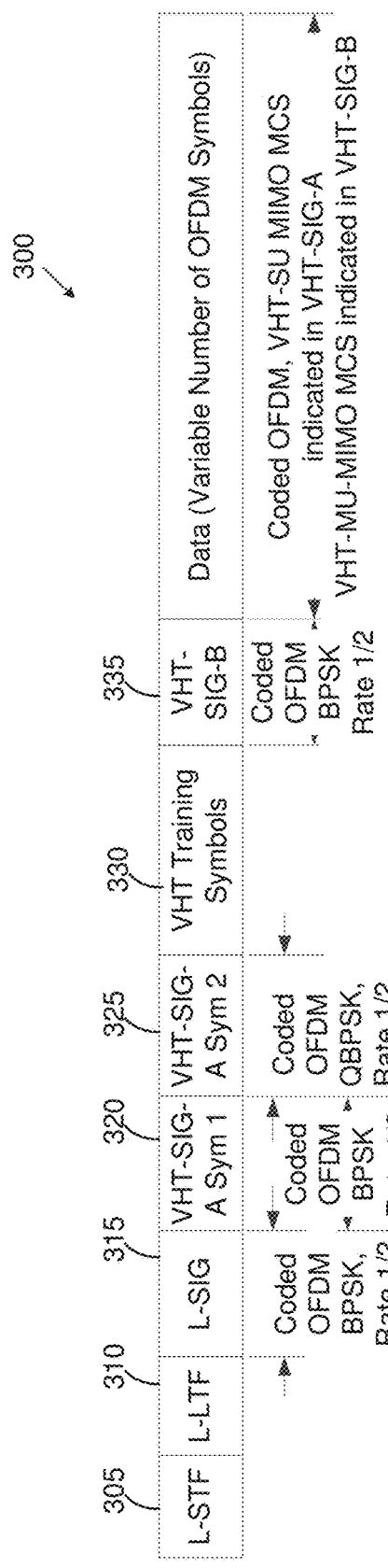
FIG. 3
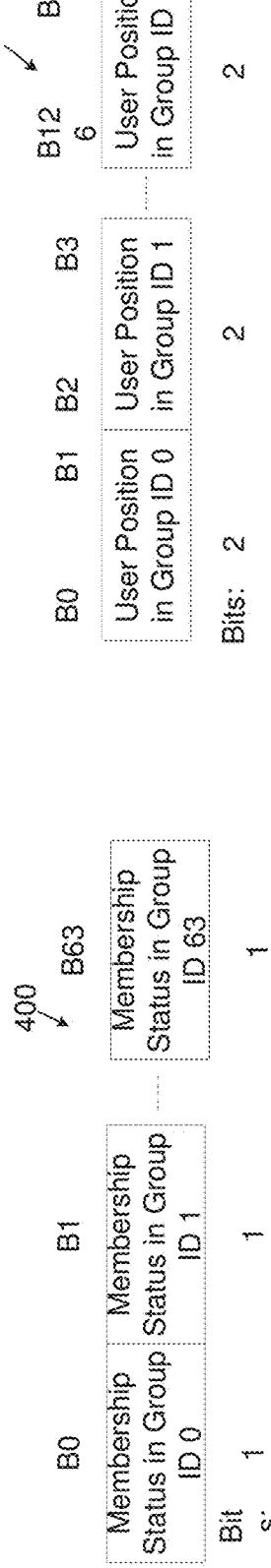
FIG. 4A
FIG. 4B
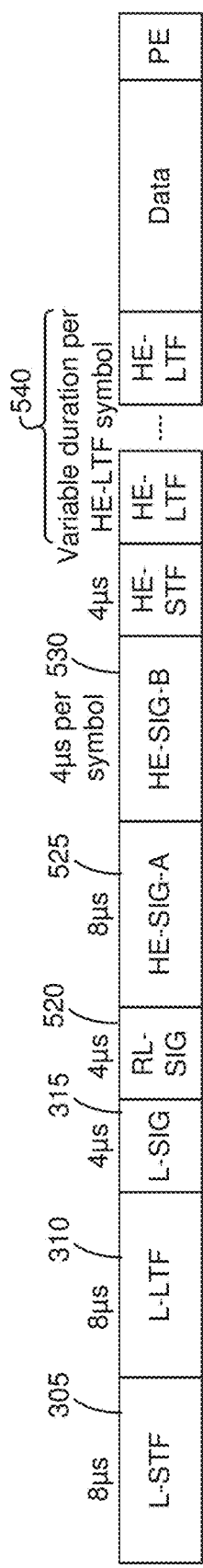
FIG. 5

FIG. 9

| 1705 → | #1 | #2 | #3 | #4 | #5 | #6 | #7 | #8 | #9 |
|---|---|---|---|---|---|---|---|---|---|
| 1 | 26 | 26 | 26 | 26 | 26 | 26 | 26 | 26 | 26 |
| 2 | 52 | | 52 | | 26 | | | | 52 |
| 3 | | 106 | | | 26 | | | 106 | |
| 4 | 52 | | | 52 | 26 | 26 | 26 | 26 | 26 |
| 5 | 26 | 26 | 26 | 26 | 26 | 26 | 26 | 26 | 26 |
| 6 | 26 | 26 | 26 | 26 | 26 | 26 | 26 | 26 | 26 |
| 7 | 26 | 26 | 26 | 26 | 26 | 26 | 26 | 26 | 26 |
| 8 | 52 | | 26 | | 26 | | 26 | | 52 |
| 9 | | 52 | | 52 | 26 | 26 | 26 | 52 | |
| 10 | 52 | | 16 | | 26 | 16 | 26 | | 26 |
| 11 | 26 | 26 | 26 | 26 | 26 | 26 | 26 | 26 | 26 |
| 12 | 26 | 26 | 26 | 26 | 26 | 26 | 26 | 26 | 26 |
| 13 | 26 | 26 | 26 | 26 | 26 | 26 | 26 | 26 | 26 |
| 14 | 52 | 52 | 52 | 52 | 26 | 52 | 52 | 52 | 52 |
| 15 | | 52 | 26 | 26 | 26 | 26 | 26 | 26 | 26 |
| 16 | 52 | | 52 | | 26 | 26 | 26 | | 26 |
| 17 | 26 | 52 | | 26 | 26 | 26 | | 26 | 26 |
| 18 | 26 | | 106 | | 26 | | 52 | 106 | 52 |
| 19 | 26 | 106 | | | 26 | | | 106 | |
| 20 | | 106 | 106 | | 26 | | | 106 | |
| 21 | | | | | 26 | | | | |
| 21 | 26 | 26 | 26 | 26 | 26 | 26 | 26 | 26 | 26 |
| 23 | 26 | 26 | 26 | 26 | 26 | 26 | 26 | 26 | 26 |
| 24 | 52 | 52 | 52 | 26 | 26 | | | 26 | 52 |
| 25 | | 52 | | | 26 | | | | |
| 26 | | | | | 242 | | | | |

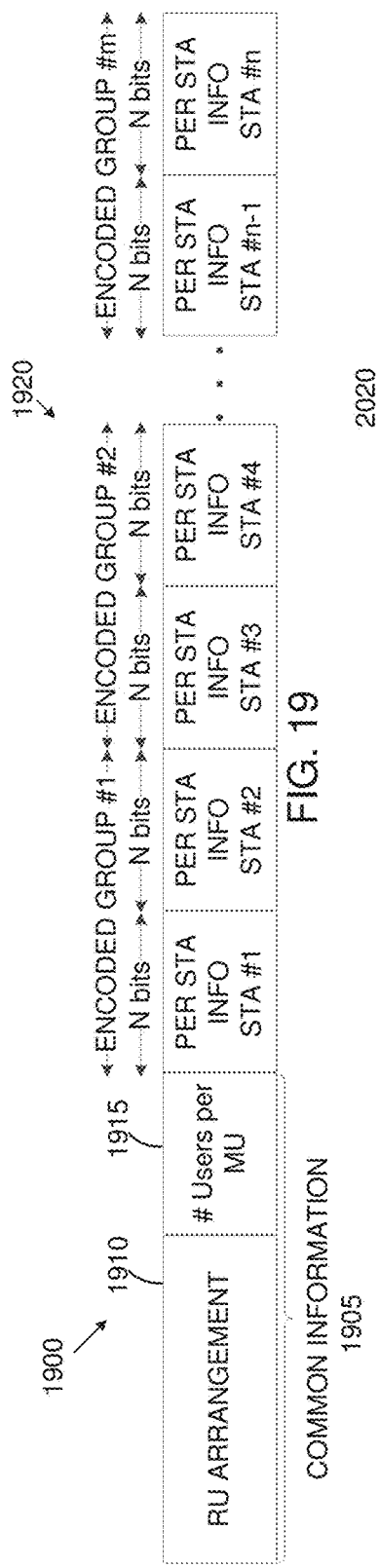
FIG. 19
FIG. 20
FIG. 22

2300

| | #1 | #2 | #3 | #4 | #5 | #6 | #7 | #8 | #9 | Num User |
|---|---|---|---|---|---|---|---|---|---|---|
| 1 | 26 | 26 | 26 | 26 | 26 | 26 | 26 | 26 | 26 | 1 |
| 2 | 52 | | 52 | | 26 | 52 | | 52 | | 1 |
| 3 | 106 | | | | 26 | 106 | | | | 64 |
| 66 | 52 | | 26 | 26 | 26 | 26 | 26 | 26 | 26 | 1 |
| 67 | 26 | 26 | 52 | | 26 | 26 | 26 | 26 | 26 | 1 |
| 68 | 26 | 26 | 26 | 26 | 26 | 52 | | 26 | 26 | 1 |
| 69 | 26 | 26 | 26 | 26 | 26 | 26 | 26 | 52 | | 1 |
| 70 | 52 | | 52 | | 26 | 26 | 26 | 26 | 26 | 1 |
| 71 | 52 | | 26 | 26 | 26 | 52 | | 26 | 26 | 1 |
| 72 | 52 | | 26 | 26 | 26 | 26 | 26 | 52 | | 1 |
| 73 | 26 | 26 | 52 | | 26 | 52 | | 26 | 26 | 1 |
| 74 | 26 | 26 | 52 | | 26 | 26 | 26 | 52 | | 1 |
| 75 | 26 | 26 | 26 | 26 | 26 | 52 | | 52 | | 1 |
| 76 | 52 | | 52 | | 26 | 52 | | 26 | 26 | 1 |
| 77 | 52 | | 52 | | 26 | 26 | 26 | 52 | | 1 |
| 78 | 52 | | 26 | 26 | 26 | 52 | | 52 | | 1 |
| 79 | 26 | 26 | 52 | | 26 | 52 | | 52 | | 1 |
| 87 | 106 | | | | 26 | 26 | 26 | 26 | 26 | 8 |
| 95 | 106 | | | | 26 | 26 | 26 | 52 | | 8 |
| 103 | 106 | | | | 26 | 52 | | 26 | 26 | 8 |
| 111 | 106 | | | | 26 | 52 | | 52 | | 8 |
| 119 | 26 | 26 | 26 | 26 | 26 | 106 | | | | 8 |
| 127 | 26 | 26 | 52 | | 26 | 106 | | | | 8 |
| 135 | 52 | | 26 | 26 | 26 | 106 | | | | 8 |
| 143 | 52 | | 52 | | 26 | 106 | | | | 8 |
| 151 | 242 | | | | | | | | | 8 |
| 159 | 484 | | | | | | | | | 8 |
| 167 | 996 | | | | | | | | | 8 |
| 175 | 2*996 | | | | | | | | | 8 |

FIG. 23

| | | 3605 | 3610 | | 3600 |
|---|---|---|---|---|---|
| 000 3602 | | COMMON INFORMATION # CHANNEL A | COMMON INFORMATION # CHANNEL B | PER-USER ALLOCATION INFORMATION | HE-SIG-B CHANNEL 1 |
| | | COMMON INFORMATION # CHANNEL C | COMMON INFORMATION # CHANNEL D | PER-USER ALLOCATION INFORMATION | HE-SIG-B CHANNEL 2 |
| 001 3602 | | COMMON INFORMATION # CHANNEL A AND B (40MHz) | COMMON INFORMATION # CHANNEL C | PER-USER ALLOCATION INFORMATION | HE-SIG-B CHANNEL 1 |
| | | COMMON INFORMATION # CHANNEL D | PER-USER ALLOCATION INFORMATION | PAD | HE-SIG-B CHANNEL 2 |
| 010 3602 | | COMMON INFORMATION # CHANNEL A | PER-USER ALLOCATION INFORMATION | PAD | HE-SIG-B CHANNEL 1 |
| | | COMMON INFORMATION # CHANNEL B | COMMON INFORMATION # CHANNEL C AND D (40MHz) | PER-USER ALLOCATION INFORMATION | HE-SIG-B CHANNEL 2 |
| 011 3602 | | | COMMON INFORMATION # CHANNEL A AND B (80MHz) | PER-USER ALLOCATION INFORMATION | HE-SIG-B CHANNEL 1 |
| | | | COMMON INFORMATION # CHANNEL C AND D (80MHz) | PER-USER ALLOCATION INFORMATION | HE-SIG-B CHANNEL 2 |
| 100 3602 | DUP | | COMMON INFORMATION # CHANNEL A, B, C AND D (40MHz) | PER-USER ALLOCATION INFORMATION | HE-SIG-B CHANNEL 1 |
| | | | COMMON INFORMATION # CHANNEL A, B, C AND D (40MHz) | PER-USER ALLOCATION INFORMATION | HE-SIG-B CHANNEL 2 |
| 101 3602 | | COMMON INFORMATION # CHANNEL A | COMMON INFORMATION # CHANNEL B | PER-USER ALLOCATION INFORMATION | HE-SIG-B CHANNEL 1 |
| | | COMMON INFORMATION # CHANNEL C | COMMON INFORMATION # CHANNEL D | PER-USER ALLOCATION INFORMATION | HE-SIG-B CHANNEL 2 |

FIG. 36

EFFICIENT SIGNALING AND ADDRESSING IN WIRELESS LOCAL AREA NETWORK SYSTEMS

CROSS-REFERENCE TO RELATED APPLICATIONS AND CLAIM OF PRIORITY

This application is a continuation of U.S. application Ser. No. 16/806,165, filed Mar. 2, 2020, which is a continuation of U.S. application Ser. No. 15/090,602, filed Apr. 4, 2016, now U.S. Pat. No. 10,582,025, which claims the benefit of U.S. Provisional Application No. 62/157,344, filed May 5, 2015., Provisional Application No. 62/189,654, filed Jul. 7, 2015, U.S. Provisional Application No. 62/203,457, filed Aug. 11, 2015, and U.S. Provisional Application No. 62/216,514, filed Sep. 10, 2015, the disclosures of which are hereby incorporated by reference in their entirety.

TECHNICAL FIELD

This disclosure relates generally to wireless local area networks (WLANs). More specifically, this disclosure relates to signaling and addressing in WLAN systems.

BACKGROUND

The IEEE 802.11ax specifications define high efficiency (HE) transmissions from an access point (AP) to a single station (STA) using single user (SU) multiple-input multiple-output (MIMO) (SU-MIMO) and to multiple STAs using multi-user MIMO (MU-MIMO) and orthogonal frequency division multiple access (OFDMA). The data packet transmitted is called a HE physical layer convergence procedure (PLCP) protocol data unit (PPDU). A special PPDU called the MU PPDU includes the data streams meant for multiple STAs transmitted using MU-MIMO and/or OFDMA. When SU-MIMO is used, the packet is called SU PPDU. The header to both SU and MU PPDUs includes information necessary to decode the PPDU. Since the same header has to indicate different types of payload to the receiver's physical layer, HE-signaling-A (HE-SIG-A) field in the header have multiple interpretations depending on certain flags that are transmitted along with the signaling fields. The MU PPDU has an additional HE-SIG-B field that communicates decoding information for the data addressed to the STAs.

SUMMARY

Embodiments of the present disclosure provide methods for efficient signaling and addressing in WLAN systems.

In one embodiment, a STA for identifying scheduling information in a WLAN is provided. The STA includes a transceiver configured to receive a header for a protocol data unit and a controller configured to identify common information for a plurality of STAs that are scheduled in the WLAN from a common field in the header, and to identify user-specific information for the STA from a user-specific field in the header that follows the common field.

In another embodiment, an AP for indicating scheduling information is provided. The AP includes a controller configured to include common information for a plurality of STAs that are scheduled in the WLAN in a common field in a header of a protocol data unit and to include user-specific information for the STAs in a user-specific field in the header that follows the common field. The AP also includes a transceiver configured to transmit the protocol data unit including the header.

In yet another embodiment, a method of operating a STA for identifying scheduling information in a WLAN is provided. The method includes receiving a header for a protocol data unit. The method also includes identifying common information for a plurality of STAs that are scheduled in the WLAN from a common field in the header. Additionally, the method includes identifying user-specific information for the STA from a user-specific field in the header that follows the common field.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, include, be included within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates an example a header structure for a VHT PPDU transmission;

FIG. 4A illustrates an example a membership status array field that may be utilized in one or more embodiments of the present disclosure;

FIG. 4B illustrates an example user position array field that may be utilized in one or more embodiments of the present disclosure;

FIG. 5 illustrates an example structure of a header for a HE PPDU transmission which may be utilized in one or more embodiments of the present disclosure;

FIG. 9 illustrates example RU arrangement indexing for 20 MHz bandwidth according to one or more embodiments of the present disclosure;

FIG. 17 illustrates an example of RU arrangement indexing for up to 242 tone RUs according to one or more embodiments of the present disclosure;

FIG. 19 illustrates an example of a signaling message including a common information portion carrying RU information and number of users per MU allocation according to one or more embodiments of the present disclosure;

FIG. 20 illustrates an example of a signaling message including a common information portion carrying RU arrangement and an MU flag according to one or more embodiments of the present disclosure;

FIG. 22 illustrates an example of a signaling message including a common information portion including resource allocation field that includes an integrated RU arrangement and MU-MIMO RU flag according to one or more embodiments of the present disclosure;

FIG. 23 an example indexing that includes RU arrangement and a number of users for MU-MIMO resources according to one or more embodiments of the present disclosure;

FIG. 36 illustrates HE-SIG-B multiplexing schemes utilizing a HE-SIG-B multiplexing format field indicating how common information is arranged in HE-SIG-B channels according to one or more embodiments of the present disclosure;

DETAILED DESCRIPTION

FIGS. 1 through 41, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
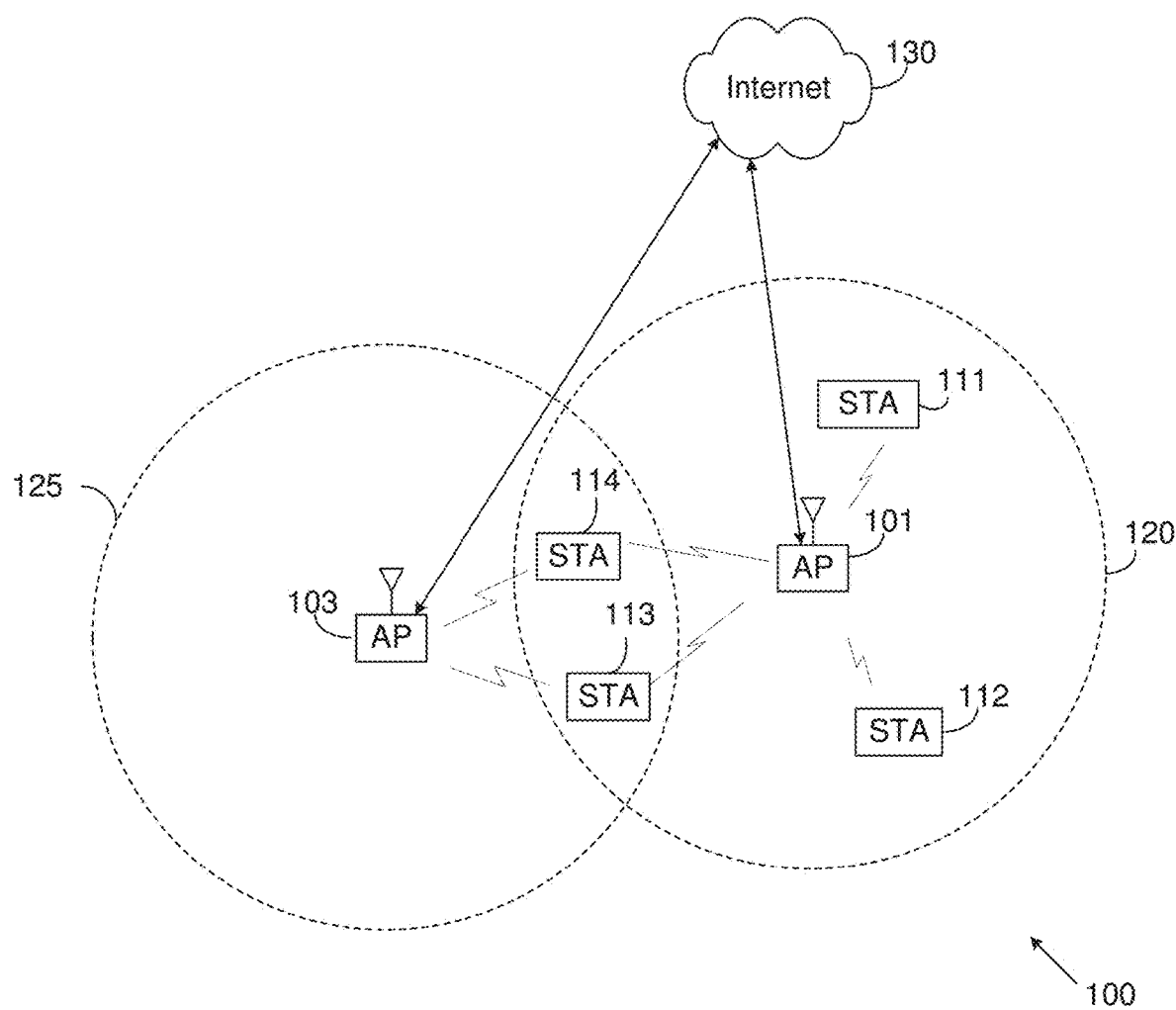
FIG. 1 illustrates an example wireless network according to illustrative embodiments of the present disclosure.

FIG. 1 illustrates an example wireless network 100 according to this disclosure. The embodiment of the wireless network 100 illustrated in FIG. 1 is for illustration only. Other embodiments of the wireless network 100 could be used without departing from the scope of this disclosure.

As illustrated in FIG. 1, the wireless network 100 includes APs 101 and 103. The APs 101 and 103 communicate with at least one network 130, such as the Internet, a proprietary Internet Protocol (IP) network, or other data network.

The AP 101 provides wireless access to the network 130 for a plurality of stations (STAs) 111-114 within a coverage area 120 of the AP 101. The APs 101-103 may communicate with each other and with the STAs 111-114 using WiFi or other WLAN communication techniques.

Depending on the network type, other well-known terms may be used instead of "access point" or "AP," such as "router" or "gateway." For the sake of convenience, the term "AP" is used in this patent document to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," "user device," or "user." For the sake of convenience, the terms "station" and "STA" are used in this patent document to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are illustrated as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for management of UL MU transmissions in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
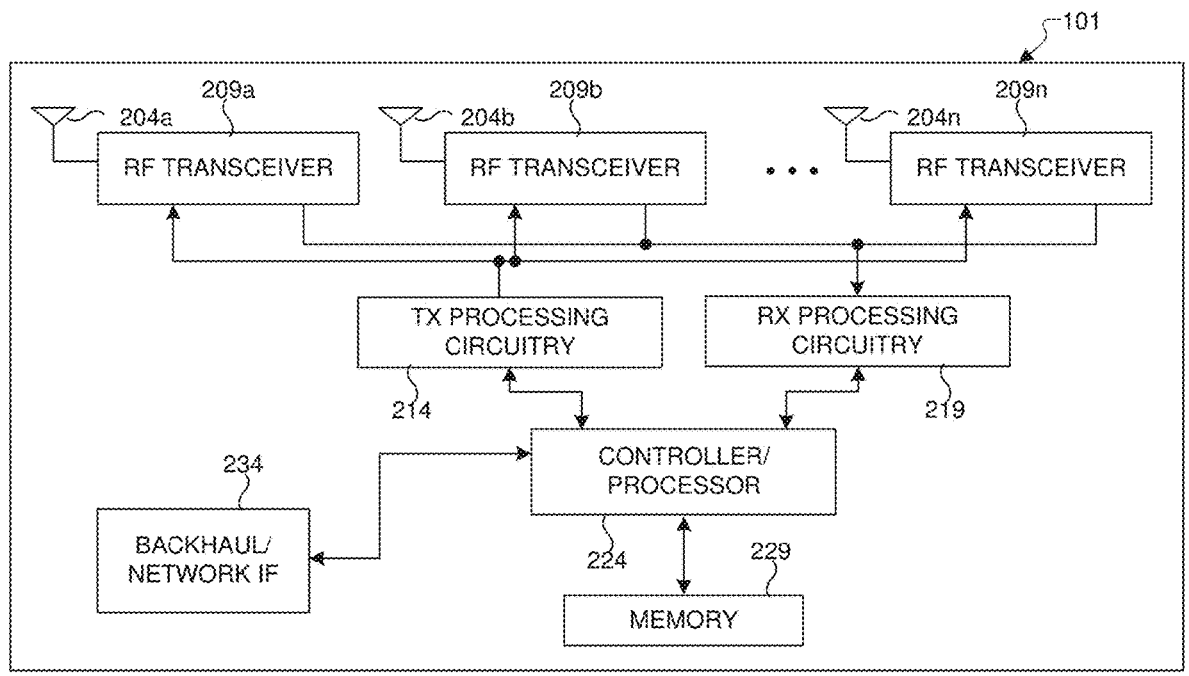
FIG. 2A illustrates an example AP according to illustrative embodiments of the present disclosure.

FIG. 2A illustrates an example AP 101 according to this disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

As illustrated in FIG. 2A, the AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234.

The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/ processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. Any of a wide variety of other functions could be supported in the AP 101 by the controller/processor 224. In some embodiments, the controller/processor 224 includes at least one microprocessor or microcontroller.

The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver.

The memory 229 is coupled to the controller/processor 224. Part of the memory 229 could include a RAM, and another part of the memory 229 could include a Flash memory or other ROM.

As described in more detail below, the AP 101 may include circuitry and/or programing for using or implementing efficient signaling and addressing in a WLAN system. Although FIG. 2A illustrates one example of AP 101, various changes may be made to FIG. 2A. For example, the AP 101 could include any number of each component illustrated in FIG. 2A. As a particular example, an access point could include a number of interfaces 234, and the controller/processor 224 could support routing functions to route data between different network addresses. As another particular example, while illustrated as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
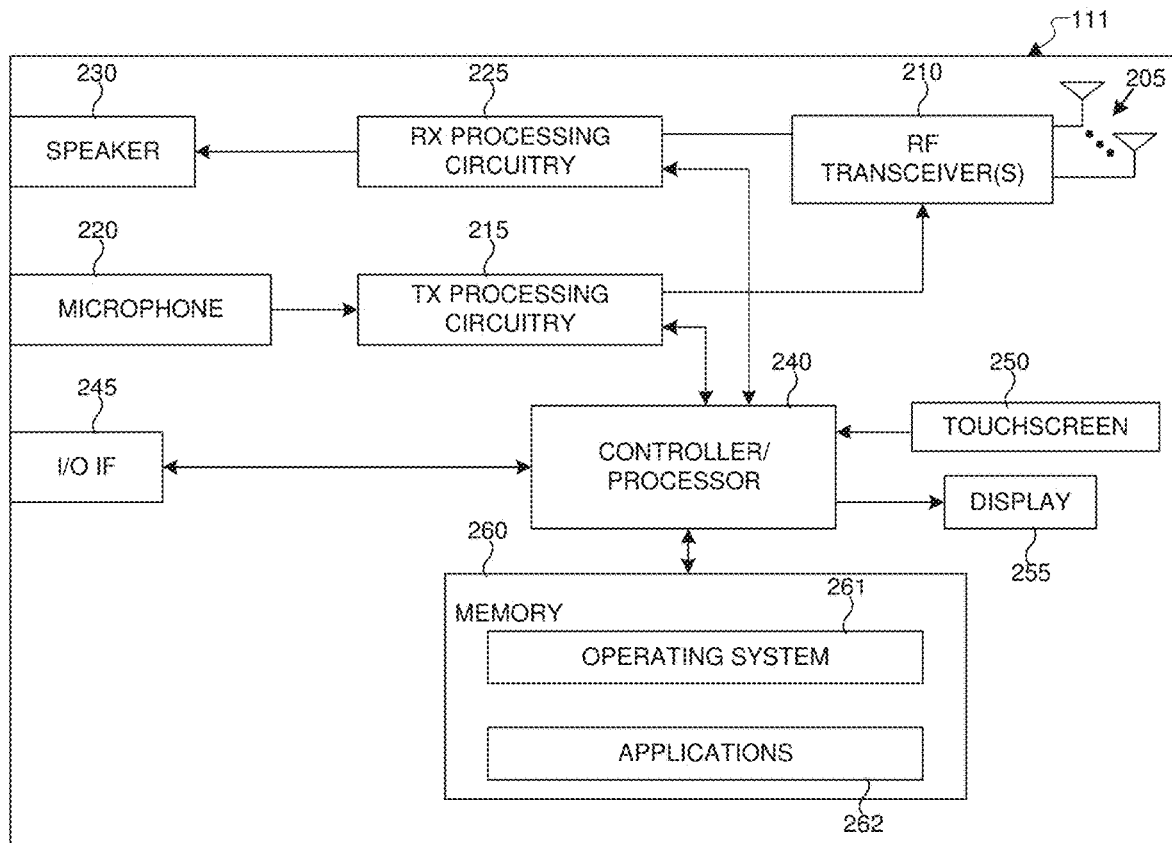
FIG. 2B illustrates an example STA according to illustrative embodiments of the present disclosure.

FIG. 2B illustrates an example STA 111 according to this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

As illustrated in FIG. 2B, the STA 111 includes multiple antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to provide management of UL MU transmissions in WLANs. In some embodiments, the controller/processor 240 includes at least one microprocessor or microcontroller.

The controller/processor 240 is also capable of executing other processes and programs resident in the memory 260, such as operations for using or implementing efficient signaling and addressing in a WLAN system. The controller/processor 240 can move data into or out of the memory 260 as required by an executing process. In some embodiments, the controller/processor 240 is configured to execute a plurality of applications 262, such as applications for MU communications, including management of UL MU transmissions in WLANs. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites.

The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices like laptops, desktops etc.

FIG. 3 illustrates an example structure 300 of a header for a VHT PPDU transmission. The example of the header structure 300 illustrated in FIG. 3 is for illustration only. Other embodiments of the header structure 300 could be used without departing from the scope of this disclosure.

The header 300 includes training fields and packet type indication fields. The header 300 includes a legacy short training field (L-STF) 305, a legacy long training field (L-LTF) 310, a legacy signal field (L-SIG) 315, a VHT signal A (VHT-SIG-A) fields 320 and 325, VHT short and long training symbols field 330, and a VHT signal B (VHT-SIG-B) field 335. The fields with a legacy prefix are meant to indicate the packet type and duration to the non-VHT legacy users who may stop further processing of the PPDU after decoding the legacy portions of the header 300. The VHT portion of the preamble includes the VHT SIG-A, VHT STF, VHT-LTF and VHT-SIG-B fields.

The VHT-SIG-A includes two parts: the first part called VHT-SIG-A1 (e.g., field 325 in header 300) and a second part called VHT-SIG-A2 (e.g., field 330 in header 300). The mapping of a Space-Time Block Coding (STBC) field, a SU VHT-MCS/MU coding field and a beamformed field in the VHT-SIG-A1 and VHT-SIG-A2 are different for VHT-SU and MU PPDUs. The SU and MU PPDUs are differentiated based on a 6 bit GROUP_ID field carried at bit positions B4-B9: a value of 0 or 63 indicates a VHT SU PPDU; otherwise, indicates a VHT MU PPDU. For each user in MU PPDU, the number of spatial streams is indicated using a 3 bit NSTS field where a value of 000 indicates that no spatial streams are transmitted for that user. The VHT-SIG-A field is transmitted at ½ code rate using binary phase-shift keying (BPSK) modulation and occupies two consecutive OFDM signals.

The VHT-SIG-B field is one symbol and includes 26 bits in a 20 MHz PPDU, 27 bits in a 40 MHz PPDU and 29 bits in 80 MHz, 160 MHz and 80+80 MHz PPDUs for each user. The fields in the VHT-SIG-B field are listed in Table 1 below. The interpretation of the fields for MU or SU PPDU is drawn from the 6 bit GROUP_ID field carried at bit positions B4-B9 in VHT-SIG-A1: a value of 0 or 63 indicates a VHT SU PPDU; otherwise, indicates a VHT MU PPDU. VHT-SIG_B Length field for user u is set as $$\left\lceil \frac{APEP - LENGTH_u}{4} \right\rceil,$$

where APEP— LENGTH$_u$ is the TXVECTOR parameter for APEP_LENGTH for user u. For each user u, the VHT-SIG-B field is binary convolutional code (BCC) encoded at rate R=½ and mapped to a BPSK constellation. Unlike VHT-SIG-A which is a commonly signaled for all users, VHT-SIG-B is user-specific and is mapped to N$_{STS,u}$ space-time streams by the user-specific elements of the first column of the P$_{VHTLTF}$ matrix.

TABLE 1 fields in the VHG-SIG-B field

| Field | VHT MU PPDU Allocation (bits) | | | VHT SU PPDU Allocation (bits) | | | Description |
| --- | --- | --- | --- | --- | --- | --- | --- |
| | 20 MHz | 40 MHz | 80 MHz 160 MHz 80 + 80 MHz | 20 MHz | 40 MHz | 80 MHz 160 MHz 80 + 80 MHz | |
| VHT-SIG-B length | B0-B15 (16) | B0-B16 (17) | B0-B18 (19) | B0-B16 (17) | B0-B18 (19) | B0-B20 (21) | Length of A-MPDU pre-EOF padding in unit of four octets |
| VHT-MCS | B16-B19 (4) | B17-B20 (4) | B19-B22 (4) | N/A | N/A | N/A | |
| Reserved | N/A | N/A | N/A | B17-B19 (3) | B19-B20 (2) | B22-B22 (2) | All ones |
| Tail | B20-B25 (6) | B21-B26 (6) | B23-B28 (6) | B20-B25 (6) | B21-B26 (6) | B23-B28 (6) | All zeros |
| Total number of bits | 26 | 27 | 29 | 26 | 27 | 29 | |

The GROUP_ID is indicated to an STA 111 by the AP 101 along with the user position of a STA 111 for one of more group IDs. GROUP_ID is a management frame transmitted only to VHT STAs and includes two fields: a membership status array field of length 8 octets (illustrated in FIG. 4) and user position array field of length 16 octets (illustrated in FIG. 5).

FIG. 4A illustrates an example a membership status array field 400 which may be utilized in one or more embodiments of the present disclosure. The example of the membership status array field 400 illustrated in FIG. 4A is for illustration only. Other embodiments of the membership status array field 400 could be used without departing from the scope of this disclosure.

Within the 8 octet membership status array field 400, the 1-bit membership status sub-field for each group ID is set as follows:

Set to 0 if STA is not a member of the group
Set to 1 if STA is a member of the group
The membership status subfields for group ID 0 (transmissions to AP) and group ID 62 (downlink SU transmissions) are reserved.

FIG. 4B illustrates an example user position array field 450 which may be utilized in one or more embodiments of the present disclosure. The example of the user position array field 450 illustrated in FIG. 4B is for illustration only. Other embodiments of the user position array field 450 could be used without departing from the scope of this disclosure.

User position array field 450 is used in the group ID management frame. A 16 octet user position array field (indexed by the group ID) includes a 2-bit user positon subfield for each of the 64 group IDs. If the membership subfield for a particular group ID is 1, then the corresponding user position subfield is encoded as illustrated in table 2 below.

TABLE 2 encoding of the user position subfield

| User Position subfield value | User Position |
|---|---|
| 00 | 0 |
| 01 | 1 |
| 10 | 2 |
| 11 | 3 |

If the membership status subfield for a group ID is 0 (meaning the STA 111 is not a member of the group), then the corresponding user position subfield in the user position array field is reserved. The user position subfields for group ID 0 (transmissions to AP) and group ID 62 (downlink SU transmissions) are reserved.

FIG. 5 illustrates an example structure 500 of a header for a HE PPDU transmission which may be utilized in one or more embodiments of the present disclosure. The example of the header structure 500 illustrated in FIG. 5 is for illustration only. Other embodiments of the header structure 500 could be used without departing from the scope of this disclosure.

The header 500 includes training fields and packet type indication fields. For example, the header 500 may be a PLCP header. The header 500 includes a legacy short training field (L-STF) 305, a legacy long training field (L-LTF) 310, a legacy signal field (L-SIG) 315, Repeated L-SIG (RL-SIG) (520), HE signal A (HE-SIG-A) and HE signal B (HE-SIG-B) fields 525 and 530, respectively, HE short and long training symbols field 535 and 540, respectively. The fields with a legacy prefix are meant to indicate the packet type and duration to the non-VHT legacy users who may stop further processing of the PPDU after decoding the legacy portions of the header 500. The HE portion of the preamble includes the RL-SIG 520, HE-SIG-A 525, HE-SIG-B 530, HE-STF 535, and HE-LTF 540. In a HE-SU PPDU, the HE-SIG-B 530 field is not present. In a HE-MU PPDU, the HE-SIG-B 530 field is present. In a HE-Extended Range PPDU, the HE-SIG-B 530 is not present and the symbols of the HE-SIG-A 525 are repeated. Various embodiments of the present disclosure provide signaling and addressing schemes for HE portion to support OFDMA that allow multiplexing of multiple users on different portions of the bandwidth and MU-MIMO. In particular, various embodiments provide HE-SIG-A and HE-SIG-B fields 525 and 530, respectively, that carry information required to interpret the HE-PPDUs. The various embodiments of the present disclosure provide the signaling necessary to support indication of bandwidth segments to different STAs in an OFDMA/MU-MIMO multiplexing protocol.

Figure 6:
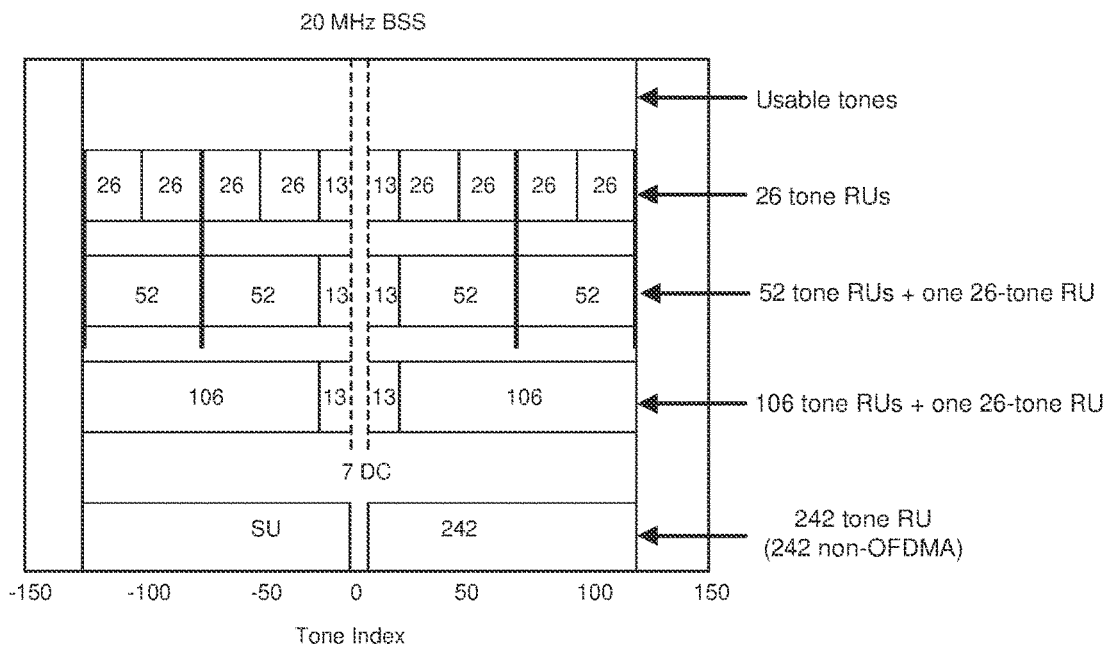
FIG. 6 illustrates an example of possible resource unit (RU) sizes and locations in a 20 MHz OFDMA PPDU that may be utilized in one or more embodiments of the present disclosure.
Figure 7:
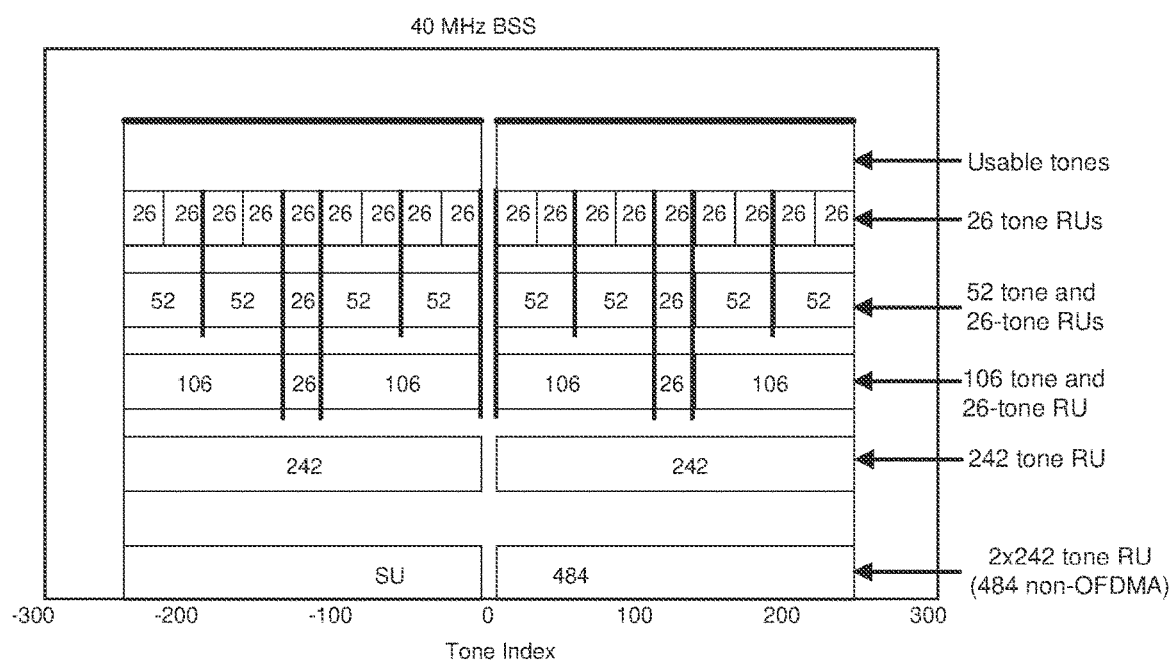
FIG. 7 illustrates an example of possible RU sizes and locations in a 40 MHz OFDMA PPDU that may be utilized in one or more embodiments of the present disclosure.
Figure 8:
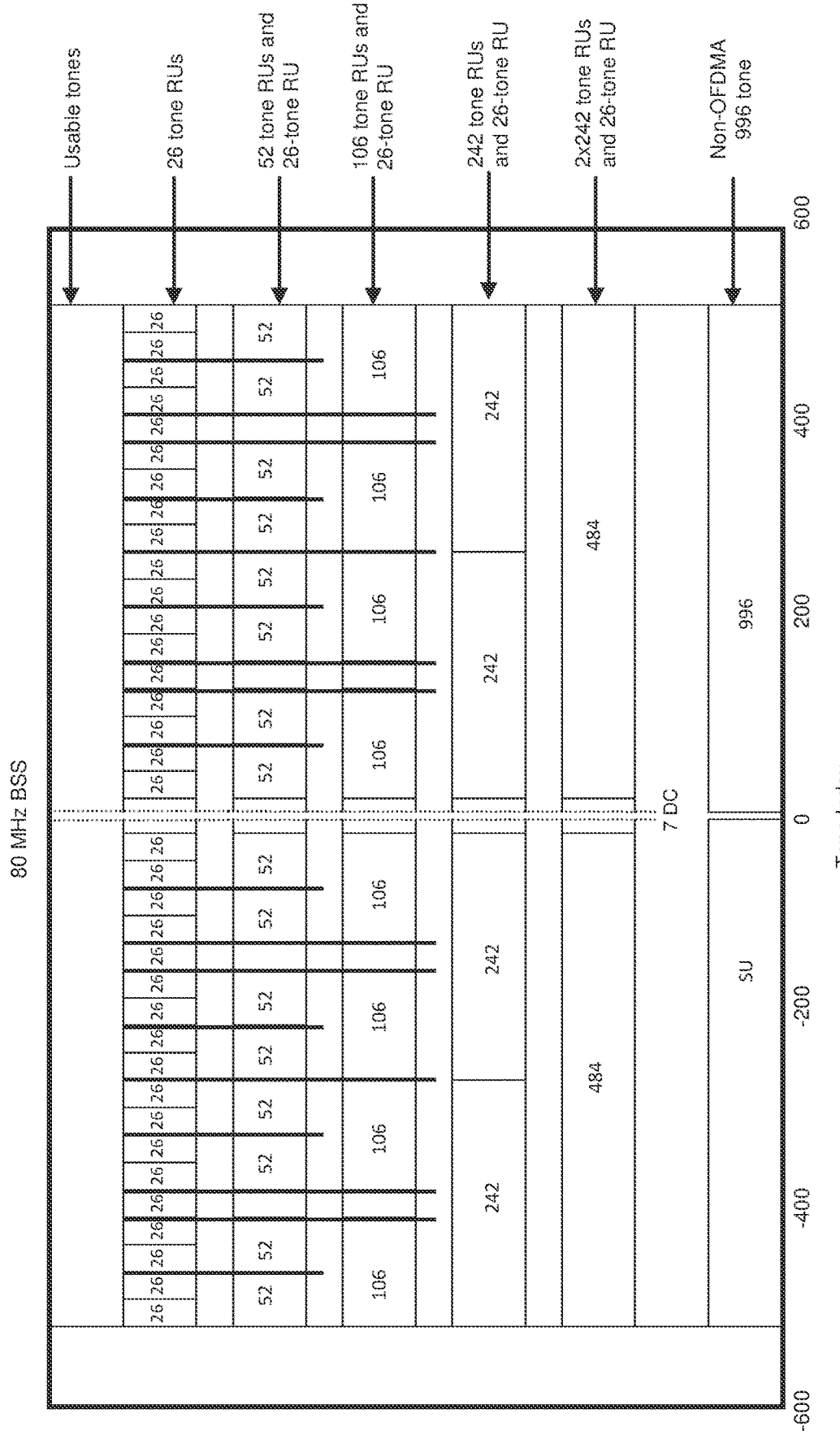
FIG. 8 illustrates an example of possible RU sizes and locations in a 80 MHz OFDMA PPDU that may be utilized in one or more embodiments of the present disclosure.

FIG. 6 illustrates an example of possible RU locations in a 20 MHz OFDMA PPDU, FIG. 7 illustrates an example of possible RU locations in a 40 MHz OFDMA PPDU, and FIG. 8 illustrates an example of possible RU locations in a 80 MHz OFDMA PPDU may be utilized in one or more embodiments of the present disclosure. The example embodiments of the RU locations illustrated in FIGS. 6-8 are for illustration only. Other RU locations could be used without departing from the scope of this disclosure.

As illustrated in FIGS. 6-8, the OFDMA structure for 802.11ax includes the following building blocks:

26-tone RU including 24 data tones and 2 pilot tones as defined for the S1G 1 MHz mode in 802.11ah (possible locations of the 26-tone RUs are fixed as illustrated in FIG. 6, FIG. 7 and FIG. 8 for 20 MHz, 40 MHz and 80 MHz OFDMA PPDUs, respectively);

52-tone RU including 48 data tones and 4 pilot tones as defined in 802.11a (possible locations of the 52-tone RUs are fixed as illustrated in FIG. 6, FIG. 7 and FIG. 8 for 20 MHz, 40 MHz and 80 MHz OFDMA PPDUs, respectively);

106 tone RU including 102 data tones and 4 pilot tones (possible locations of the 106-tone RUs are fixed as illustrated in FIG. 6, FIG. 7 and FIG. 8 for 20 MHz, 40 MHz and 80 MHz OFDMA PPDUs, respectively);

242-tone RU including 234 data tones and 8 pilot tones as defined for the VHT 80 MHz mode in 802.11ac (possible locations of the 242-tone RUs are fixed as illustrated in FIG. 7 and FIG. 8 for 40 MHz and 80 MHz OFDMA PPDUs, respectively); and 484-tone RU including 468 data tones and 16 pilot tones as defined for the VHT 160 MHz mode in 802.11ac (possible locations of the 484-tone RUs are fixed as illustrated in FIG. 8 for 80 MHz OFDMA PPDUs).

Possible RU locations in a 40 MHz OFDMA PPDU are equivalent to two replicas of the possible RU locations in a 20 MHz OFDMA PPDU. Possible RU locations in an 80 MHz OFDMA PPDU are equivalent to two replicas of the possible RU locations in a 40 MHz OFDMA PPDU. An OFDMA PPDU can include a mix of different RU sizes within each 242 RU boundary.

Figure 9:
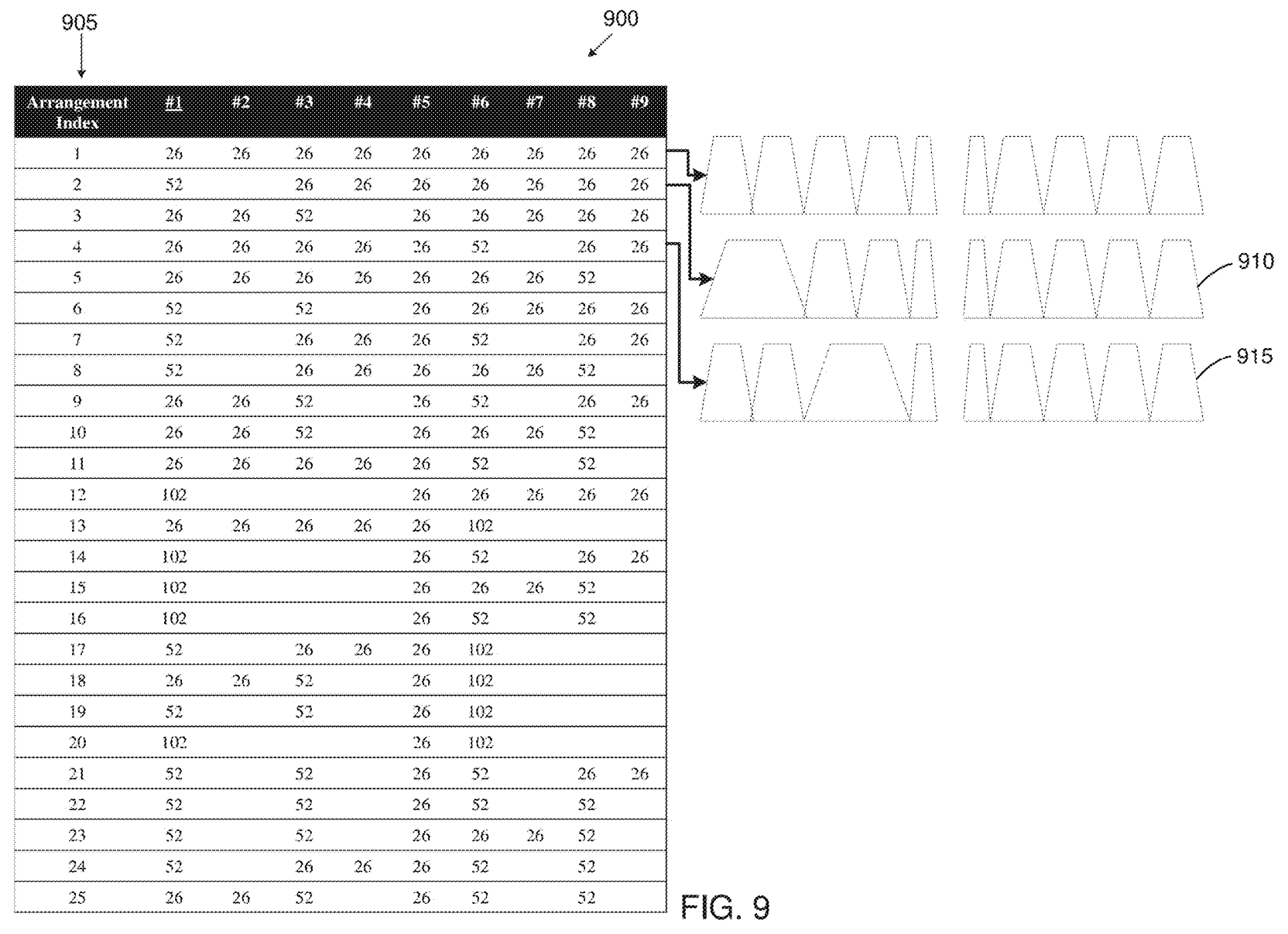

With all the different size and locations RUs in the different bandwidths, embodiments of the present disclosure provide for efficient signaling and addressing in the allocation of such RUs. Various embodiments of the present disclosure provide RU arrangement indexing, HE-SIG-B multiplexing, derivation of extended group ID by concatenation and user position update, and implicit indication of a number of allocations by use of an extended group ID. As used herein, VHT-SIG may also be referred to as high efficiency (HE)-SIG FIG. 9 illustrates an example RU arrangement indexing 900 for 20 MHz bandwidth according to one or more embodiments of the present disclosure. The embodiment of the RU arrangement indexing 900 illustrated in FIG. 9 is for illustration only. Other embodiments of the index 900 could be used without departing from the scope of this disclosure.

Various embodiments of the present disclosure provide RU arrangement indexing. In one or more embodiments of the present disclosure, an arrangement index 905 of RU arrangements is transmitted in the HE-SIG. A combination of RUs, made up of different RU sizes that cumulatively span the bandwidth indicated is called an RU arrangement.

For example, 9 RUs made up of 26 tones per RU arranged at locations indicated in FIG. 3 is a combination and spans 20 MHz. An RU arrangement also encodes positional information—e.g., in a 20 MHz PPDU, a [52 26 26 26 26 26 26 26] arrangement 910 is different from a [26 26 52 26 26 26 26 26] arrangement 915 as illustrated. The different RU arrangements are indexed and the index 905 of an arrangement is signaled in the common duplicated portion of SIG-B. Using this index 905, the frequency domain arrangement of the RUs is indicated to the STAs receiving the packet containing the header with the HE-SIG. Using indexing of the RU arrangement, a common information for all users, embodiments of the present disclosure can save significant overhead compared to other methods of RU arrangement signaling which may indicate RU position per each STA scheduled in the PPDU. For 20 MHz bandwidth, there are a total of 25 different RU arrangements possible, each of which spans the bandwidth as illustrated in FIG. 9. Therefore, a total of 5 bits are used to index all RU arrangements for 20 MHz bandwidth. An index of 0 or 1 (as illustrated in FIG. 9) (e.g., depending on where the index starts) can indicate that all the RUs are made of 26 tone RUs.

Figure 10:
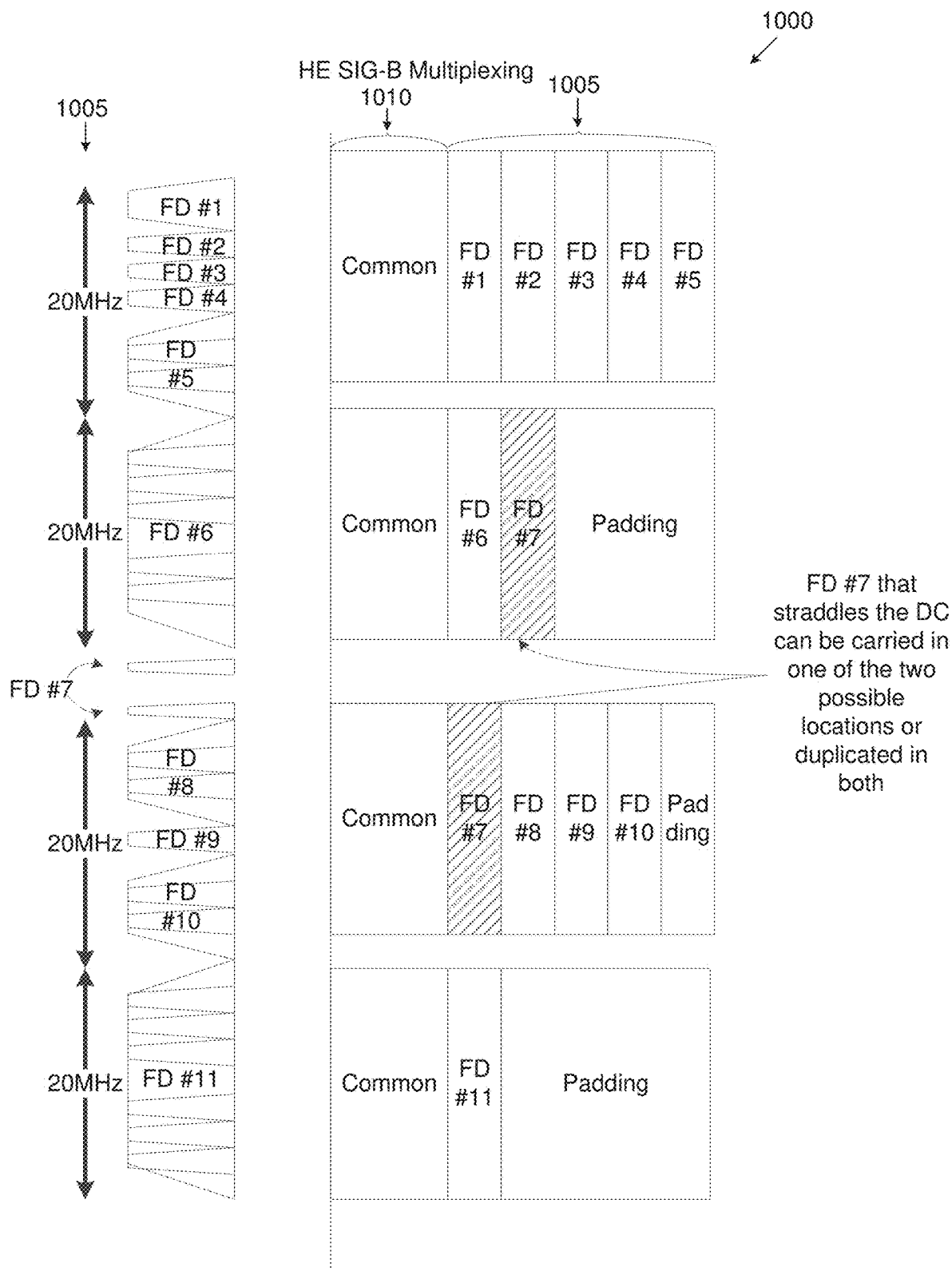
FIG. 10 illustrates an example of HE-SIG-B contents including a common signaling portion that is duplicated according to one or more embodiments of the present disclosure.

FIG. 10 illustrates an example of HE-SIG-B contents 1000 including a common signaling portion that is duplicated according to one or more embodiments of the present disclosure. The example of the HE-SIG-B contents 1000 illustrated in FIG. 10 is for illustration only. Other embodiments of the HE-SIG-B contents 1000 could be used without departing from the scope of this disclosure.

In an embodiment of the present disclosure, the user allocations for both single and multi-user PPDUs are indicated in HE-SIG-B fields. In some other embodiments, the user allocations only for the multi-user PPDUs (MU PPDUs) are indicated in the HE-SIG-B fields. The allocation information for single-user MIMO PPDUs includes a binary convolution code component that is duplicated every 20 MHz segment 1005 over the bandwidth indicated in HE-SIG-A. The allocation information for multi-user information includes two parts. The first part is a common information portion 1010. For example, the common information portion 1010 includes a N_rua(BW) bit RU arrangement index indicating the RU arrangement in the frequency domain (FD), the N_sta bit number of STAs signaled in the allocation and a list of N bits STA-IDs along with 1 bit SU/MU allocation per STA. In total, there are N_rua(BW)+ N_sta(N+2) bits indicated in the first part. The 1 bit SU/MU allocation indicates if the STA 111 is part of a MU allocation over the RU or not. The ordering of the STAs determines the user position in the MU allocation.

A reserve STA-ID can indicate no allocation over a particular RU. For example, STA-ID 0 can indicate that the RU is left empty and no data is carried over the RU. The common information portion 1010 can be specific for each 20 MHz segment 1005 and different among each 20 MHz segments 1005 over which data is transmitted.

The second part is a user specific portion 1015 that includes user-specific information carried in the 20 MHz segment 1005 in which the user's data is transmitted. The user specific portions 1015 in each 20 MHz segment 1005 include relevant decoding information for STAs scheduled in the RUs under that 20 MHz segment. Each 20 MHz segment 1005 includes an arrangement of RUs the largest of which is a 242 RU allocation. All allocations that fall with-in this 242 RU is carried in 20 MHz channel whose center frequency is closest to the allocation. This per 20 MHz indication carries STA specific information, for example, STBC, beamformed, LDPC coding, LDPC extra symbol, number of spatial streams, MCS of the allocation, etc. In one example, this information is individually encoded with a CRC. In another example, the information of all STAs scheduled in the 20 MHz segment is jointly encoded by the AP 101 using a blind convolutional code. Since the STA-IDs are indicated in the common information portion 1010, the information is arranged according to the order in which STAs are listed in the common information portion 1010 portion of the signaling.

Users scheduled as part of an MU-MIMO allocation can have different information content than a single user allocation. For example, MCS of the MU-MIMO information can be the same for all users and the MCS field can be common for users scheduled in MU-MIMO. When users are scheduled using MU-MIMO over the entire bandwidth, the user specific information portion 1015 is common in all 20 MHz segments 1005 and is duplicated for each segment 1005. The STAs scheduled in such an MU-MIMO allocation can derive the information from the RU arrangement index and SU/MU bit indicator in the HE-SIG-A. In another example, the STAs can derive this information from a 2 bit SU/MU indicator where a particular 2 bit index indicates MU-MIMO over the entire bandwidth.

Scheduling information for users scheduled in the center 26 tone RU of a 80 MHz allocation or allocations greater than 20 MHz can be carried in one or more portions. In one example, the center 26 tone scheduling information can be carried as the last allocation information in the 20 MHz whose subcarrier index precedes the first subcarrier index of the center 26 tone RU. In another example, the center 26 tone scheduling information can be carried as the first allocation information in the 20 MHz segment whose subcarrier index is greater than the first subcarrier index of the center 26 tone RU. In yet another example, the center 26 tone scheduling information can be duplicated in the 20 MHz segments that encase the central 26 tone allocation. The order of the STA-ID indicated in the common portion is maintained when carrying information for the center 26 tone RU when carried using any of the above three examples.

In an embodiment of the present disclosure, the user allocations for multi-user PPDUs are indicated in HE-SIG-B fields. The allocation information for multi-user information includes two parts—a common part indicating the allocation index and other common fields (e.g., common information portion 1010) as discussed above and a per 20 MHz signaling part (e.g., user specific portion 1015) with fields carried as discussed above. The allocation information for a single user PPDU is carried in the HE-SIG-A.

Figure 11:
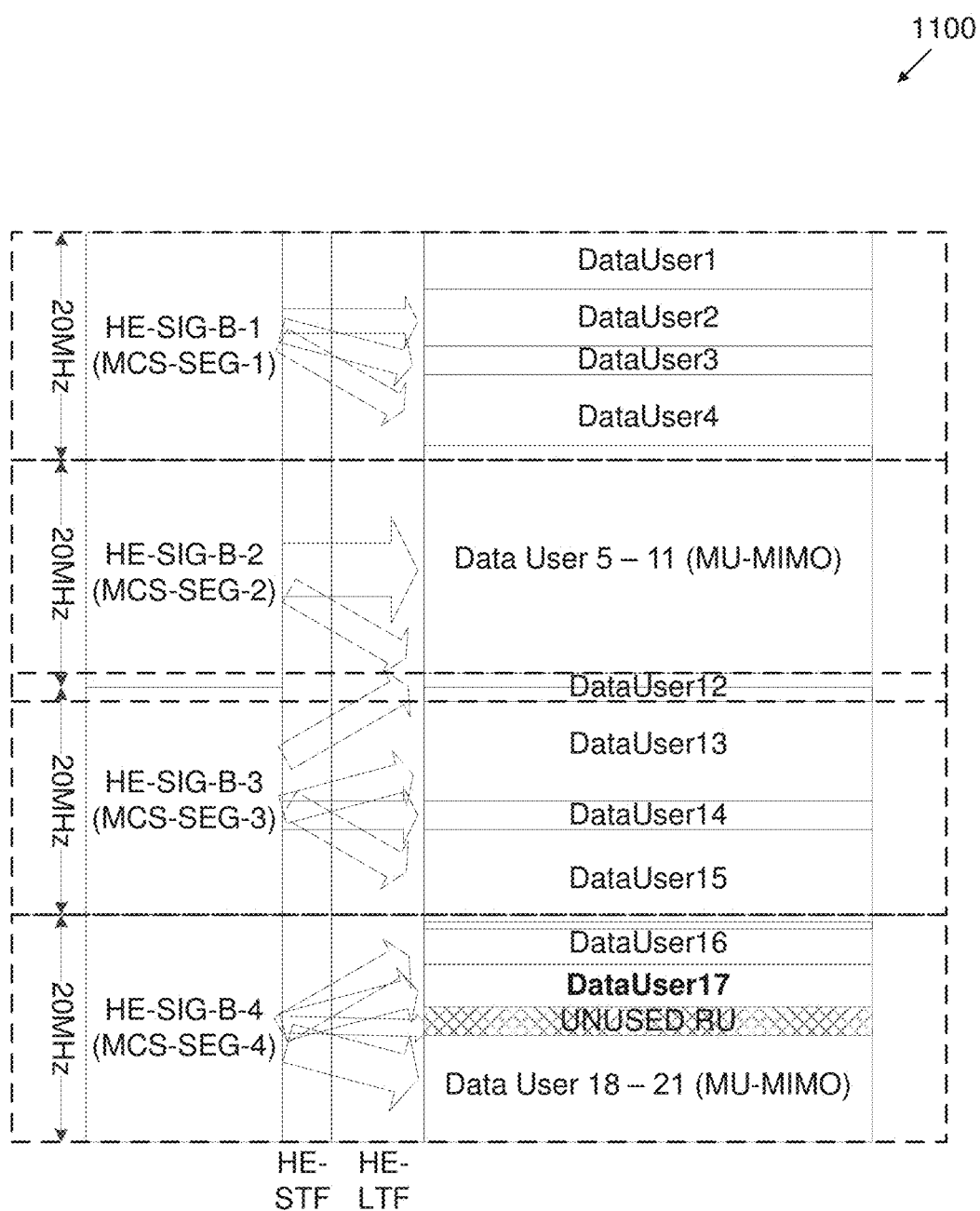
FIG. 11 illustrates an example of signaling in HE-SIG-B and relation to the user data according to one or more embodiments of the present disclosure.

FIG. 11 illustrates an example of the HE-SIG-B signaling 1100 and relation to the user data according to one or more embodiments of the present disclosure. The example of the HE-SIG-B signaling 1100 illustrated in FIG. 11 is for illustration only. Other embodiments of the HE-SIG-B signaling 1100 could be used without departing from the scope of this disclosure.

In an embodiment of the present disclosure, the per 20 MHz HE-SIG-B carrying the signaling information and the user data indicated by the signaling information are carried in the same 20 MHz frequency channels as illustrated in FIG. 11.

In this illustrative embodiment, the MCS used for the common and user specific fields of HE-SIG-B in each 20 MHz segment can be different. The MCS for the HE-SIG-B can be signaled in one of two ways. In one example, the MCS for each 20 MHz segment is indicated in HE-SIG-A. In a second example, the MCS for each 20 MHz segment is carried in a section of the HE-SIG-B common fields. This section of the HE-SIG-B common fields can indicate the resource allocation and the MCS for the remaining allocation information and is encoded separately with a fixed MCS.

In an embodiment of the present disclosure, the common and user specific portions of the allocations per 20 MHz can be encoded together using blind convolutional code. The STAs decode each HE-SIG-B in each 20 MHz segment to identify which section carries information for them.

In an embodiment of the present disclosure, the common portion including user allocation and STA-IDs can be encoded separately per 20 MHz segment from the user specific portion. In this embodiment, the user specific portion is encoded in a separate convolution code.

In an embodiment of the present disclosure, the 26 tone RU split around the DC tones may be left unused in an 80 MHz MU PPDU.

In an embodiment of the present disclosure, the resource allocation for the 26 tone RU split around the DC tones of an 80 MHz MU PPDU may be indicated by an extra bit in either of the 20 MHz segments or duplicated in both 20 MHz segments surrounding the DC tones. The presence of the extra bit is triggered by the bandwidth signaling when set to 80 MHz. The extra bit comes immediately preceding the 5 bit RU arrangement indication for the 20 MHz segment. The STA ID and user specific portion also follow the same order of indication as the RU arrangement indication.

Figure 12:
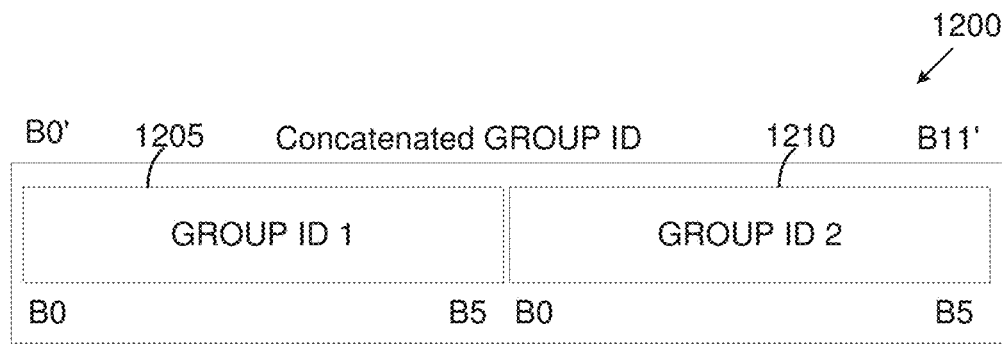
FIG. 12 illustrates an example of concatenated or extended group identifier (ID) generation by concatenating two group IDs according to one or more embodiments of the present disclosure.

FIG. 12 illustrates an example of concatenated or extended group ID 1200 generated by concatenating two group IDs according to one or more embodiments of the present disclosure. The example of the group ID 1200 illustrated in FIG. 12 is for illustration only. Other embodiments of the group ID 1200 could be used without departing from the scope of this disclosure.

Embodiments of the present disclosure provide extended group ID 1200 and updated user positions. In an embodiment of the present disclosure, a new MU-MIMO allocation over the entire bandwidth or in a particular RU is indicated by an extended group ID derived by concatenating two group IDs 1205 and 1210 where the notion of group ID is as defined in IEEE 802.11ac specification. The STAs are indicated to the groups they belong using the group ID and user position management messages. Each 6 bit group ID 1205 and 1210 indicates a group of 4 users where each user is indicated a position going from 0 (00) to 3 (11). The concatenation of two group IDs 1205 and 1210 produces a 12 bit extended group ID 1200 where the first 6 bits indicates the first group ID 1205 and the second 6 bits indicates the second group ID 1210 as illustrated in FIG. 12.

Figure 13:
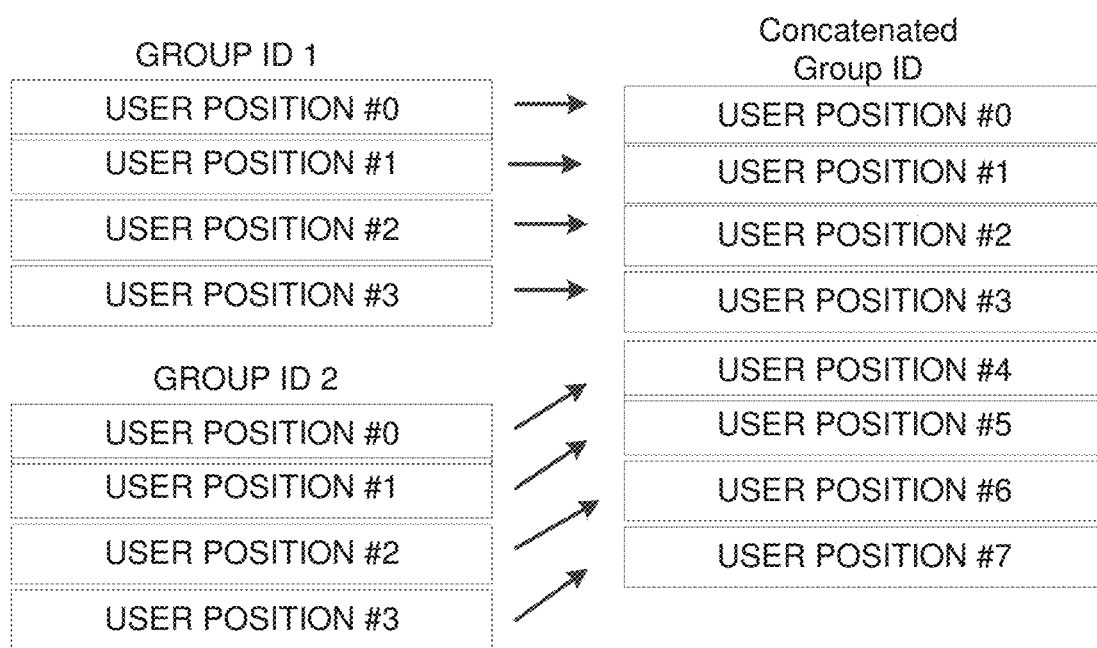
FIG. 13 illustrates an example of user position being updated based on the group ID concatenation according to one or more embodiments of the present disclosure.

The user positions are updated to reflect the concatenation i.e., users in the first group ID retain their positions from 0 (000) to 3 (011) and the users in the second indicated group ID update their positions from 4 (100) to 7 (111) as illustrated in FIG. 13. The concatenation of the group ID enlarges the number of users who can be scheduled in a MU-MIMO allocation to 8. FIG. 13 illustrates an example of user position being updated based on the group ID concatenation according to one or more embodiments of the present disclosure. Other embodiments could be used without departing from the scope of this disclosure.

The use of a reserve group ID index (for example group ID 0 or group ID 63) in the system in the second 6 bits of the concatenated group ID 1200 indicates a no-enlargement of MU-MIMO user group and the maximum number of users scheduled in MU-MIMO user group is 4. Only the users in the first 6 bits of the concatenated group ID 1200 are scheduled in the MU-MIMO allocation.

Embodiments of the present disclosure provide for the use of group ID and derived number of allocations. In this embodiment, the user allocations for both single and multi-user PPDUs are indicated in HE-SIG-B fields. The allocation information for single-user MIMO PPDUs includes a binary convolution code component that is duplicated every 20 MHz segment 1005 over the bandwidth indicated in HE-SIG-A. As discussed above, the allocation information for multi-user information includes two parts. The common information portion 1010 includes N_rua bit RU arrangement index indicating the RU arrangement in the frequency domain, and a list of N bits STA-ID (for SU allocation) or group ID (for MU-MIMO allocation) along with 1 bit SU/MU allocation per ID. In total, there are N_rua(BW)+N_sta(N+1) information bits indicated in the common information portion 1010. The 1 bit SU/MU allocation indicates if the succeeding N-bit ID is a group ID or a STA ID. The group ID used can be a concatenated group ID as described in the preceding embodiment or a new enlarged group ID mechanism used for 802.11ax. The user positions are updated if concatenation of group ID is used. A reserve STA-ID can indicate no allocation over a particular RU. For example, STA-ID 0 can indicate that the RU is left empty and no data is carried over the RU. The common information portion 1010 can be specific for each 20 MHz segment and different among each 20 MHz segments over which data is transmitted.

The second part is the user specific information portion 1015 that includes user-specific information carried in the 20 MHz segment in which the user's data is transmitted. Each 20 MHz segment includes an arrangement of RUs the largest of which is a 242 RU allocation. All RU allocations that fall with-in the umbrella of this 242 RU (e.g., as illustrated in FIG. 10) are carried in 20 MHz channel whose center frequency is closest to the allocation. This per 20 MHz indication carries STA specific information, for example, STBC, beamformed, LDPC coding, LDPC extra symbol, number of spatial streams, MCS of the allocation, etc. In one example, this information is individually encoded with a CRC. In another example, the information of all STAs scheduled in the 20 MHz segment is jointly encoded by the AP 101 using a blind convolutional code. Since the STA-IDs are indicated in the common information portion 1010, the information is arranged according to the order in which STAs are listed in the common information portion 1010 portion of the signaling.

Users scheduled as part of an MU-MIMO allocation can have different information content than a single user allocation. For example, MCS of the MU-MIMO information can be the same for all users and the MCS field can be common for users scheduled in MU-MIMO. When users are scheduled using MU-MIMO over the entire bandwidth, the user specific information portion 1015 is common in all 20 MHz segments 1005 and is duplicated for each segment 1005. The STAs scheduled in such an MU-MIMO allocation can derive the information from the RU arrangement index and SU/MU bit indicator in the HE-SIG-A. In another example, the STAs can derive this information from a 2 bit SU/MU indicator where a particular 2 bit index indicates MU-MIMO over the entire bandwidth.

Scheduling information for users scheduled in the center 26 tone RU of an 80 MHz allocation or allocations greater than 20 MHz can be carried in one or more portions. In one example, the center 26 tone scheduling information can be carried as the last allocation information in the 20 MHz whose subcarrier index precedes the first subcarrier index of the center 26 tone RU. In another example, the center 26 tone scheduling information can be carried as the first allocation information in the 20 MHz segment whose subcarrier index is greater than the first subcarrier index of the center 26 tone RU. In yet another example, the center 26 tone scheduling information can be duplicated in the 20 MHz segments that encase the central 26 tone allocation. The order of the STA-ID indicated in the common portion is maintained when carrying information for the center 26 tone RU when carried using any of the above three examples.

In an embodiment of the present disclosure, the user allocations for multi-user PPDUs are indicated in HE-SIG-B fields. The allocation information for multi-user information includes two parts—a common part indicating the allocation index and other common fields (e.g., common information portion 1010) as discussed above and a per 20 MHz signaling part (e.g., user specific portion 1015) with fields carried as discussed above. The allocation information for a single user PPDU is carried in the HE-SIG-A.

In an embodiment of the present disclosure, the number of OFDM symbols used to carry the common part may be variable and be indicated by a phase change in the pilot symbol of the last OFDM symbol carrying the common part HE-SIG-B. The number of OFDM symbols used to carry the per 20 MHz signaling part may be variable and be indicated by a phase change in the pilot symbol of the last OFDM symbol carrying the per 20 MHz signaling part. In another embodiment, the number of OFDM symbols used in the per 20 MHz signaling portion of the HE-SIG-B can be (implicitly) derived from the allocation size in the common portion and not explicitly signaled.

In an embodiment of the present disclosure, the resource allocation information can be indicated along with the user specific information in a self-included block—where the user has all the information necessary to encode the data allocated to it. Each block includes information like STA-ID, the MCS/MIMO and other fields necessary to decode the data, the resource position index and a CRC that can be hashed with the STA-ID. The STA 111 decodes each block and checks if the allocation belongs to him. The STA 111 continues decoding till all the resource allocation blocks are completely decoded. Multiple RUs may be allocated to an STA. In an embodiment of the present disclosure, each self-included block can be encoded separately using a convolutional code. In an embodiment of the present disclosure, multiple self-included blocks that support the same MCS can be encoded together using a convolutional code.

Figure 14:
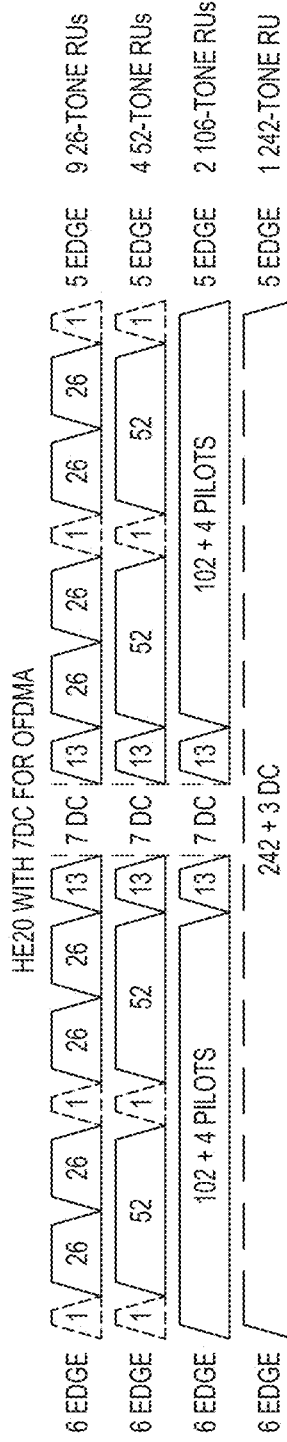
FIG. 14 illustrates an example of RU position indexing for 20 MHz according to one or more embodiments of the present disclosure.
Figure 15:
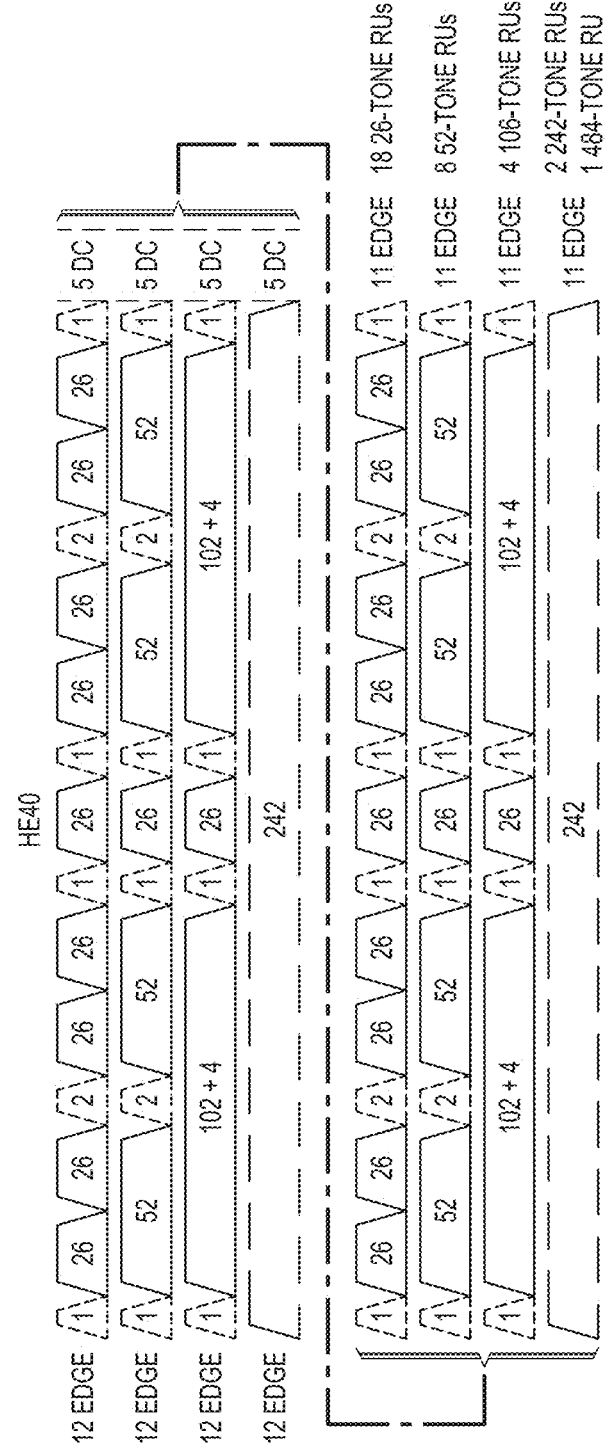
FIG. 15 illustrates an example of RU position indexing for 40 MHz according to one or more embodiments of the present disclosure.
Figure 16:
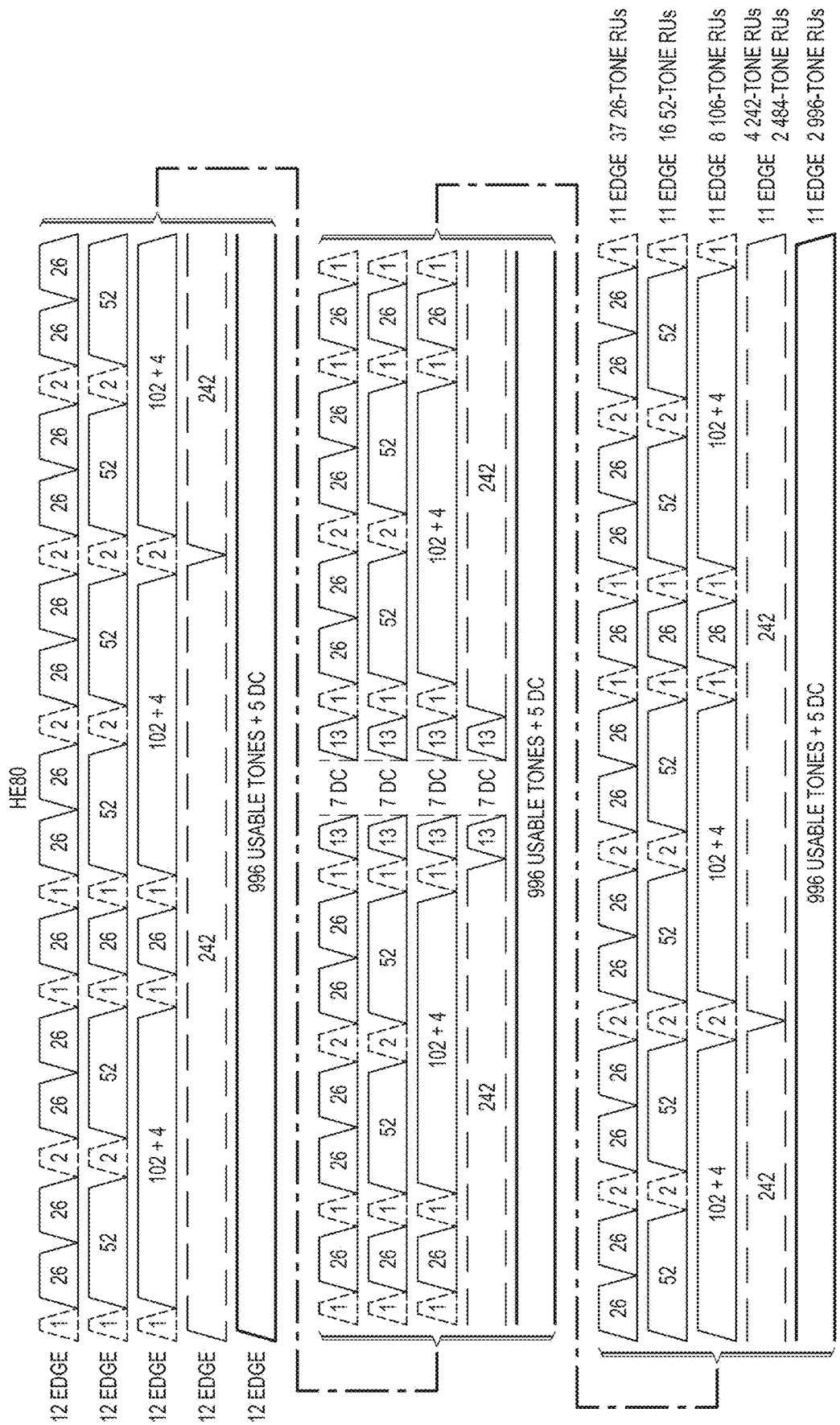
FIG. 16 illustrates an example of RU position indexing for 80 MHz according to one or more embodiments of the present disclosure.

FIG. 14 illustrates an example of RU position indexing for 20 MHz, FIG. 15 illustrates an example of RU Position Indexing for 40 MHz, and FIG. 16 illustrates an example of RU Position Indexing for 80 MHz may be utilized in one or more embodiments of the present disclosure. The example embodiments of the RU Position Indexing illustrated in FIGS. 14-16 are for illustration only. Other RU position indexing could be used without departing from the scope of this disclosure.

In these illustrative embodiments, the resource allocation information carried in the self-included block includes the index of the RU that carries the MPDU for a signaled STA. The RU index is a numerical index of the RU depending on its size. For example, there are 9 26 tone RUs, 4 52 tone RUs, 2 106 tone RUs, and 1 242 tone RUs— accounting for a total of 16 RU indices that can be indicated with 4 bits for 20 MHz as illustrated in FIG. 14. For the 40 MHz bandwidth scenario, FIG. 15 illustrates 33 different RU indices that use 6 bits to indicate the various indices. For 80 MHz bandwidth scenario, FIG. 16 illustrates 69 different RU indices. Here, the AP 101 transmits 7 bits for RU indexing.

The size of the RU position index carried in the block of user allocation information varies according to the bandwidth information signaled in the HE-SIG-A. If the size of the block of a user allocation is fixed, then the extra bits needed for the RU position indication can be derived by shrinking the size of the partial STA-ID signaled in the block. For example, in a 20 MHz MU PPDU, the STA-ID can use 9 bits and the RU position indexing is 5 bits (4 bits+1 bit reserved). In a 40 MHz MU PPDU, the STA-ID can use 8 bits and the RU position indexing can be 6 bits. In an 80 MHz MU PPDU, the STA-ID can use 7 bits and the RU position indexing can be 7 bits.

In an embodiment of the present disclosure, the block of allocation information for a STA 111 in a MU PPDU can appear in a 20 MHz segment that is different from the 20 MHz segment that carries the data for the this STA. This flexibility allows better load balancing and packing efficiency for HE-SIG-B. The RU position indexing can indicate any RU in the bandwidth and therefore the block of allocation information for a STA 111 in a MU PPDU can be carried in any 20 MHz without being tied closely to the location of the assigned RU in the bandwidth.

In an embodiment of the present disclosure, the MCS used for different self-included block or group of self-included blocks can be different. The MCS used for each group is signaled in HE-SIG-A or common information in the HE-SIG-B. The use of different MCS can be different across different portions of the bandwidth and/or different OFDM symbols that the HE-SIG-B occupies.

FIG. 17 illustrates an example of RU arrangement indexing 1700 for up to 242 tone RUs according to one or more embodiments of the present disclosure. The example of the RU arrangement indexing 1700 illustrated in FIG. 17 is for illustration only. Other embodiments of the header structure 1700 could be used without departing from the scope of this disclosure.

In this illustrative embodiment, RU arrangement indexing 1700 includes a plurality of indexes 1705 that indicate a particular RU arrangement 1710 for a 20 MHz resource bandwidth. Given the fixed location of the RUs in the OFDMA tone plan, the enumeration of possible RU arrangements over a specific bandwidth is specified and signaled. The RU arrangement indexing 1700 for the 20 MHz bandwidth with a span of 242 tone RUs or less is used as a building block for larger bandwidth indexing. Specifying RU arrangement admits flexibility to signal only those RU arrangements that are supported over a specified bandwidth. Using 4 building blocks, a 26 tone RU, a 52 tone RU, a 106 tone RU and a 242 tone RU, a 20 MHz channel admits 26 different RU arrangements as illustrated in FIG. 17. Thus, the AP 101 uses 5 signaling bits to indicate the RU arrangement indexed according to FIG. 17. Further, removing the bandwidth specificity, 5 signaling bits may be used to indicate the RU arrangement (26 RU arrangements) as well as the 4 sizes of RU building blocks.

Figure 18:
FIG. 18 illustrates an example of extending RU arrangement indexing to indicate large RU sizes according to one or more embodiments of the present disclosure.

FIG. 18 illustrates an example of extended RU arrangement indexing 1800 to indicate large RU sizes according to one or more embodiments of the present disclosure. The example of the extended RU arrangement indexing 1800 illustrated in FIG. 18 is for illustration only. Other embodiments of the extended RU arrangement indexing 1800 could be used without departing from the scope of this disclosure.

In this illustrative embodiment, the RU arrangement indexing 1700 is extended given that 6 more RU arrangements that can be indicated to use up the 5 bit budget (i.e., 5 bits can signal 32 different possibilities) discussed above. The extended RU arrangement indexing 1800 indicates larger RU building blocks. As illustrated in FIG. 18, a 484 tone RU, 996 tone RU and a 2*996 (1992) tone RU can be signaled by transmitting an index 1805 that encodes the arrangement of an RU.

IEEE 802.11ax plans to support MU-MIMO on RUs of size greater than or equal to 106 tones. RU arrangements that indicate the use of an RU larger than or equal to 106 tone RUs are likely to include MU transmissions. Accordingly, various embodiments of the present disclosure provide signaling for an RU arrangement that is accommodated to indicate MU-MIMO resources. Specifically, the signaling provides contents of the common arrangement to specify both RU arrangement and MU-MIMO resource information. In addition to identifying the MU-resources, the provided signaling indicates the number of users scheduled in an MU-MIMO resource.

In an embodiment of the present disclosure, the number of users scheduled using MU-MIMO is explicitly signaled. When an MU-MIMO capable RU is signaled in the RU arrangement, the bits following the RU arrangement indicate the number of users per MU allocation. Since only some RU sizes can support MU-MIMO, the bit sequence will be all zero if the RU sizes cannot support MU-MIMO or if no MU-MIMO is used in the PPDU. If RU arrangements are indicated in granularity of 20 MHz or 242 tone RUs, then there can be at most two RUs spanning the same bandwidth as a 242 tone RU that is capable of carrying MU-MIMO in a PPDU. Given a maximum of 8 users can be carried in an MU-MIMO PPDU, each RU capable of transmitting MU-MIMO uses 3 bits. Therefore, up to 6 bits may be used per SIG-B channel with a granularity of 242 tone RU, that is, 3 bits per 106 tone RU. The common information includes a 5 bit RU arrangement and a 6 bit indication for number of users in MU-MIMO resource, 3 per 106 tone RU. When RU size greater than 106 tone RU is indicated in the arrangement, only the 3 least significant bits (LSBs) are used to indicate MU-MIMO users. A non-zero indication in the 3 bits indicates positively for MU-MIMO, the specific value of 3 bits indicates the number of users signaled in the MU-MIMO resource. The AP 101 sets the number of STA users per MU field to 000000, if RU arrangement precludes use of MU-MIMO.

FIG. 19 illustrates an example of a signaling message 1900 including a common information portion 1905 carrying RU information and number of users per MU allocation according to one or more embodiments of the present disclosure. The example of the signaling message 1900 illustrated in FIG. 19 is for illustration only. Other embodiments of the signaling message 1900 could be used without departing from the scope of this disclosure.

As illustrated, the RU arrangement field 1910 and the number of users per MU-MIMO resource field 1915 together form the common information portion 1905 of a HE-SIG-B channel for a 20 MHz segment. The following per-user signaling portion 1920 carries information individually for each of the users. The number of users for whom the information is carried is derived from the number of RUs indicated in the RU arrangement field 1910 and the number of users indicated in MU-MIMO resources. The total number of per-STA information elements carried is a product of the number of RUs and the number of users in MU-MIMO. Each of the per-STA information elements carry a STA-ID field with a bit width to identify the STA 111 scheduled in the MU-PPDU. Multiple per-STA information elements can be encoded together in a group as illustrated in FIG. 19.

FIG. 20 illustrates an example of a signaling message 2000 including a common information portion 2005 carrying RU arrangement and an MU flag according to one or more embodiments of the present disclosure. The example of the signaling message 2000 illustrated in FIG. 20 is for illustration only. Other embodiments of the signaling message 2000 could be used without departing from the scope of this disclosure.

In this illustrative embodiment, the signaling message 2000 includes a MU flag field 2015 following the RU arrangement field 2010 that indicates if an RU capable of carrying MU-MIMO carries MU-MIMO in the transmitted PPDU. If RU arrangements are indicated in granularity of 20 MHz or 242 tone RUs, then there can be at most two RUs spanning the same bandwidth as a 242 tone RU that is capable of carrying MU-MIMO in a PPDU. Therefore, a 2 bit MU flag in the field 2015— indicates if MU is supported on the RU size (1 bit per 106 tone RU). In this example, the flag is set to 0 if no MU-MIMO is used in the PPDU or if the RU arrangement precludes use of MU-MIMO. The flag is set to 1 if the RU indicated carries MU-MIMO— the first bit in the flag indicating the first RU of size 106 tones and a second bit in the flag indicating the second RU of size 106 tones. For RU arrangements indicating only 106 tone RU or 242 tone RU and higher sizes, the LSB of the 2 bit flag can indicate MU for the RUs indicated or both bits can be set to indicate presence of MU-MIMO in the resource. The RU arrangement field 2010 and the MU flag field 2015 are included in the common information portion 2005 in the HE-SIG-B channel as illustrated in FIG. 20.

The per-user signaling portion 2020 follows the common information portion 2005 for the HE-SIG-B channel and carries information used to identify users as well as the decoding information for the data PPDU for the users. RU allocations addressed to a single user are identified by a STA-ID and are of a particular size. MU-MIMO RU allocations are identified using a group ID and are of a size different from the SU allocations. The information for all users scheduled using MU-MIMO on a RU is carried together and the users are identified using a common group ID. The size of the MU allocation information is different from the size of the SU allocation information. MU users are signaled and encoded together. SU allocation information is signaled separately and groups of SU allocations may be encoded together or separately. If the MU flag indicates the presence of MU-MIMO allocation, then the STA 111 identifies that the allocation information at position corresponding to the RU position in the bandwidth is a MU allocation and is of a size different from the STA allocation as illustrated in FIG. 20.

FIG. 22 illustrates an example of a signaling message 2200 including a common information portion 2205 including resource allocation field that includes an integrated RU arrangement and MU-MIMO RU flag according to one or more embodiments of the present disclosure. The example of the signaling message 2200 illustrated in FIG. 22 is for illustration only. Other embodiments of the signaling message 2200 could be used without departing from the scope of this disclosure.

Figure 21:
FIG. 21 illustrates an example of RU arrangement indexing including additional indices for RU arrangements when signaling MU-MIMO resources according to one or more embodiments of the present disclosure.

In this illustrative embodiment, the RU arrangement and MU-MIMO flag are encoded together in the RU arrangement and MU field 2210. The RU arrangement and MU field 2210 is a transmitted sequence of bits that forms the common information portion 2205 of the HE-SIG-B channel. In addition to the 29 indices that show RU arrangements (e.g., as illustrated in FIGS. 17 and 18), additional arrangement fields are added that indicate a same RU arrangement but are different. One arrangement field indicates SU arrangements and the other arrangement field indicates the presence of MU-MIMO. For example, index 3 (e.g., as illustrated in FIG. 17), 30, 31, and 32 (e.g., as illustrated in FIG. 21) refer to the same [106 26 106] arrangement, but index 3 indicates only SU, while indices 30, 31 and 32 indicate presence of MU-MIMO in either or both of the 106 tone RUs. From the 20 indices with no MU-MIMO, a 15 additional indices that have at least one RU where MU-MIMO is used. As a result, a total of 44 RU indices increases the RU signaling overhead to 6 bits and is carried in the common information portion 2205 of the HE-SIG-B channel as illustrated in FIG. 22. The additional arrangement indices 2105 are indicated in FIG. 21, which illustrates an example of RU arrangement indexing 2100 including additional indices 2105 for RU arrangements when signaling MU-MIMO resources according to one or more embodiments of the present disclosure. The example of the RU arrangement indexing 2100 illustrated in FIG. 22 is for illustration only. Other embodiments of the RU arrangement indexing 2100 could be used without departing from the scope of this disclosure.

Encoding the MU-MIMO RUs along with the RU arrangement does not disambiguate the number of users per MU-MIMO RU when STA-ID addressing is used. In an embodiment, additional signaling bits are used to indicate the number of users and are carried in the common information portion 2205 of the HE-SIG-B channel.

In this illustrative embodiment, the per-user signaling portion 2220 follows the common information portion 2205 for the HE-SIG-B channel and carries information used to identify users as well as the decoding information for the data PPDU for the users. RU allocations addressed to a single user are identified by a STA-ID and are of a particular size. MU-MIMO RU allocations are identified using a Group ID and are of a size different from the SU allocations. The information for all users scheduled using MU-MIMO on a RU is carried together and all of them are identified using a common group ID. The size of MU-Allocation information is different from SU allocations. MU users are signaled and encoded together. SU allocation information is signaled separately and may be groups of SU allocations may be encoded together or separately. If the RU arrangement indicates MU-MIMO RU, then the STA 111 is informed that the allocation information at position corresponding to the RU position in the bandwidth is a MU allocation and is of a size different from the STA allocation as illustrated in FIG. 22.

Figure 24:
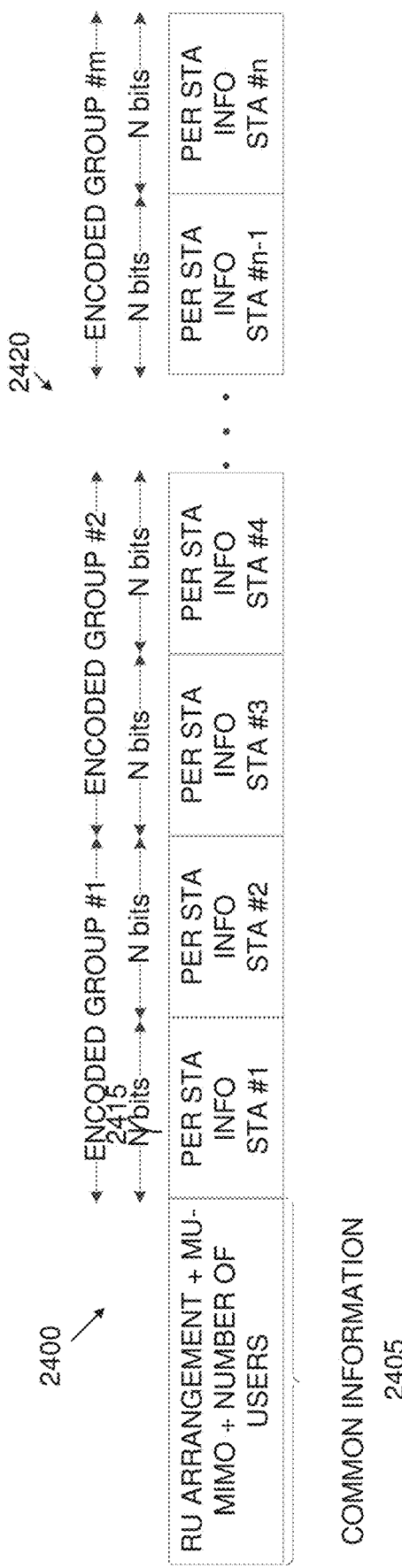
FIG. 24 illustrates an example of a signaling message including a common information portion including both the RU arrangement and the number of users for MU-MIMO RUs in a HE-SIG-B channel according to one or more embodiments of the present disclosure.

FIG. 24 illustrates an example signaling message 2400 including a common information portion 2405 including both the RU arrangement and the number of users for MU-MIMO RUs in a HE-SIG-B channel according to one or more embodiments of the present disclosure. The example of the signaling message 2400 illustrated in FIG. 24 is for illustration only. Other embodiments of the signaling message 2400 could be used without departing from the scope of this disclosure.

In this illustrative embodiment, a resource allocation index signaled in the common information portion 2405 of HE-SIG-B channel includes an indication of (i) the RU Arrangement, (ii) if MU-MIMO Capable RUs carry MU-MIMO, and (iii) the number of users multiplexed using MU-MIMO. A transmitted resource allocation index will differ when different RU arrangements are used or when for the same RU arrangement, different number of users multiplexed using MU-MIMO. Since up to 8 users can be multiplexed in an MU-MIMO allocation, 8 indices indicating different number of users for a MU-MIMO capable RU within the same RU arrangement. The tabulated indices encoding jointly the RU arrangements and the number of users for a MU-MIMO index is illustrated in FIG. 23, which illustrates an example indexing 2300 that includes RU arrangement and a number of users for MU-MIMO resources according to one or more embodiments of the present disclosure. The example of the indexing 2300 illustrated in FIG. 23 is for illustration only. Other embodiments of the indexing 2300 could be used without departing from the scope of this disclosure.

For example, as illustrated in FIG. 23, index 3 & 4 indicate an RU arrangement [106 26 106] over a channel. Index 3 refers to SU transmissions in the RU while index 4 refers to MU MIMO in the first 106 RU with 2 users and SU in the remaining RUs. There are total of 64 different indices that refer to the same [106 26 106] RU arrangement, each with differing number of users in either of the MU-MIMO capable 106 tone RUs. For the different RU sizes and arrangements possible, a total of 175 different indices can be signaled and use 8 signaling bits that are carried in the common information portion 2405 of the HE-SIG-B channel as illustrated in FIG. 24.

Jointly indicating the RU arrangement and the number of MU-MIMO users in an MU-MIMO resource results in a compact common information field and identifies the number of per-user information fields that follow. The per-user signaling portion 2420 follows the common information portion for the HE-SIG-B channel and carries information necessary to identify users as well as the decoding information for the data PPDU for the users. It admits both STA-ID and group ID addressing for MU-MIMO. An arrangement of the per-user information element where each user is identified by an STA-ID is illustrated in FIG. 24.

In an embodiment, the RU allocation index can communicate indices that indicate unused resources and used resources. The total number of per-STA information fields that follow changes depending on the number of used resources indicated by the index. No per-STA information fields are sent for resources indicated to be unused in the resource allocation index. For certain arrangements involving larger or equal RU sizes, the central 26 tone RU may not be used or allocated to any STA-ID to improve padding efficiency as illustrated in the Table 3 below.

TABLE 3

RU indexes for improved padding efficiency

| | #1 | #2 | #3 | #4 | #5 | #6 | #7 | #8 | #9 | Num User |
|---|---|---|---|---|---|---|---|---|---|---|
| 176 | | 106 | | | X | | 106 | | | 64 |
| 240 | 52 | | 52 | | X | 52 | | 52 | | 1 |

Four different configurations for indicating the RU arrangement and MU-MIMO resources in the common information portion of a HE-SIG-B channel have been discussed above with regard to FIGS. 19, 20, 22, and 24. A summary of these configurations including an identification of the number of bits required or used for each configuration and the impact of the signaling choice on the succeeding user signaling portion illustrated in FIG. 25. The example of the configuration summary illustrated in FIG. 23 is for illustration only. Other embodiments of the configurations could be used without departing from the scope of this disclosure. Configurations 1 and 4 are flexible and identify unambiguously, the number of users in an MU-MIMO allocation used in an RU. There configurations are flexible in accommodating either STA-ID or group ID addressing the succeeding user signaling portion. Although, they slightly favor the STA-ID signaling with improved efficiency for the case. Configurations 2 and 4 can be supported by using group ID to address users in MU-MIMO allocation since the MU-flag indicated separately or jointly does not disambiguate the number of users in the MU-MIMO allocation.

Figure 26:
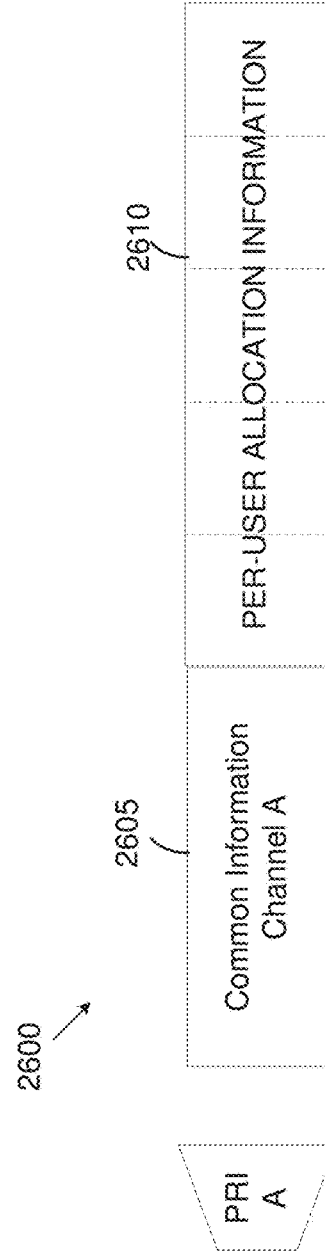
FIG. 26 illustrates an example of a HE-SIG-B channel transmission format for 20 MHz including a common information portion followed by per-user allocation information portion according to one or more embodiments of the present disclosure.
Figure 25:
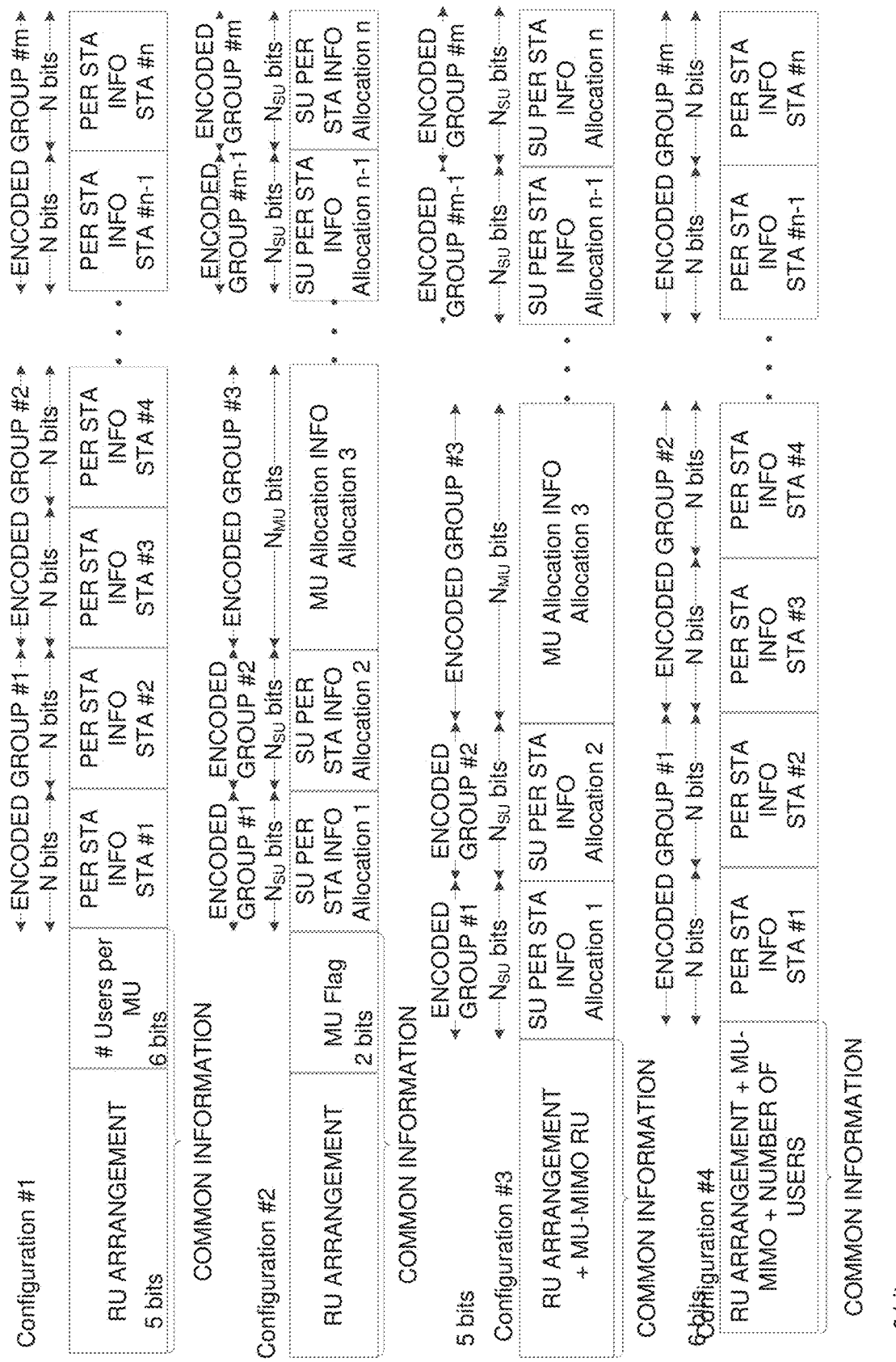
FIG. 25 illustrates an example of different common information types for a signaling message according to one or more embodiments of the present disclosure.

FIG. 26 illustrates an example of a HE-SIG-B channel transmission format 2600 for 20 MHz including a common information portion 2605 followed by per-user allocation information portion 2610 according to one or more embodiments of the present disclosure. The example of the HE-SIG-B channel transmission format 2600 illustrated in FIG. 26 is for illustration only. Other embodiments of the HE-SIG-B channel transmission format 2600 could be used without departing from the scope of this disclosure.

In this illustrative embodiment, the HE-SIG-B format 2600 for a 20 MHz MU PPDU is constructed using a common information portion 2605 followed by a per-user allocation information portion 2610 26. The RU Arrangement+MU-MIMO information is signaled in the common information portion 2605 followed by the per-user allocation information portion 2610. The STA 111 uses the common information portion 2605 and the position of the STA's per-user allocation to unambiguously identify the RU including the STA's data.

Figure 27:
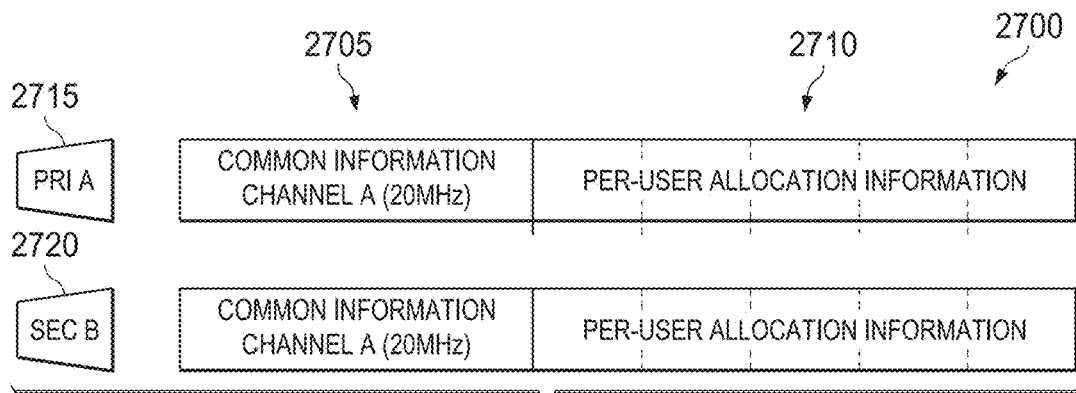
FIG. 27 illustrates an example of a HE-SIG-B transmission for format 40 MHz bandwidth including two HE-SIG-B channels according to one or more embodiments of the present disclosure.

FIG. 27 illustrates an example of a HE-SIG-B channel transmission format 2700 for 40 MHz bandwidth including two HE-SIG-B channels according to one or more embodiments of the present disclosure. The example of the HE-SIG-B channel transmission format 2700 illustrated in FIG. 27 is for illustration only. Other embodiments of the HE-SIG-B channel transmission format 2700 could be used without departing from the scope of this disclosure.

In this illustrative embodiment, the HE-SIG-B format 2700 for a 40 MHz MU PPDU includes two channels 2715 and 2720. Each HE-SIG-B 2715 and 2720 channel carries different information and each indicates a RU granularity up to 242 tone RU that spans the 20 MHz channel the RU is carried in. Thus, HE-SIG-B channels include the control information in the 20 MHz sub-carriers closest to the data sub-carriers. Each channel 2715 and 2720 carries RU allocation information for users scheduled and includes a common information portion 2705 as well as the user specific information portion 2710. The common portion and user-specific portion for HE-SIG-B channel 1 2715 indicates the allocation information for users scheduled in the primary 20 MHz and the common portion and user specific portion for HE-SIG-B channel 2 2720 indicates the allocation information for users scheduled in secondary 40 MHz. The HE-SIG-B channels 2715 and 2720 can be of different sizes and can indicate different number of users. However, the channels 2715 and 2720 end at the same symbol. When the number of users indicated is different in each HE-SIG-B channel, the HE-SIG-B channel indicating fewer users is required to pad to equalize the length of both HE-SIG-B channel and ensure symbol alignment.

Figure 28:
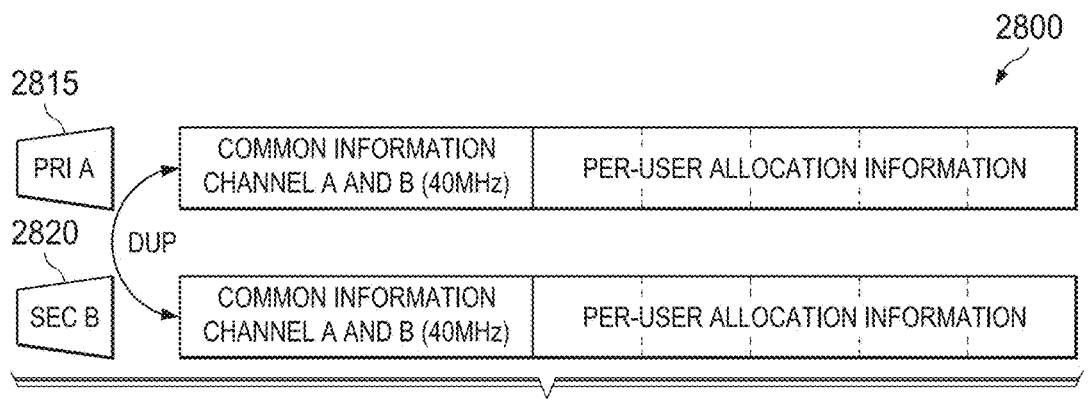
FIG. 28 illustrates an example of a HE-SIG-B transmission format when a 484 tone RU is signaled indicating transmission over the entire 40 MHz bandwidth according to one or more embodiments of the present disclosure.

FIG. 2800 illustrates an example of a HE-SIG-B transmission format 2800 when a 484 tone RU is signaled indicating transmission over the entire 40 MHz bandwidth according to one or more embodiments of the present disclosure. The example of the HE-SIG-B channel transmission format 2800 illustrated in FIG. 28 is for illustration only. Other embodiments of the HE-SIG-B channel transmission format 2800 could be used without departing from the scope of this disclosure.

In this illustrative embodiment, when 484 unit RU is scheduled in a 40 MHz MU PPDU, the two HE-SIG-B channels 2815 and 2820 will indicate the same information i.e., the contents of HE-SIG-B channel 1 2815 is duplicated in the HE-SIG-B channel 2 2820 as illustrated in FIG. 28.

Figure 29:
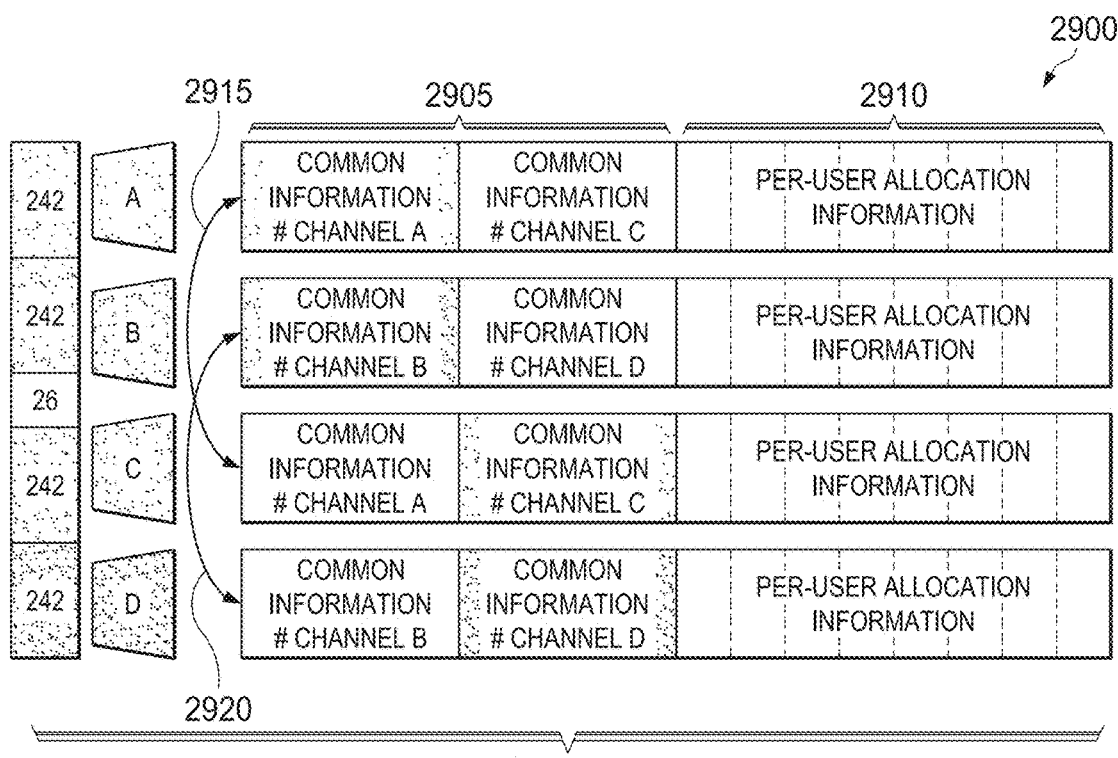
FIG. 29 illustrates an example of HE-SIG-B multiplexing for 80 MHz including 2 channels, each carrying independent information per a 20 MHz HE-SIG-B channel according to one or more embodiments of the present disclosure.

In another embodiment, when 484 tone RU is scheduled in 40 MHz PPDU, the per-user allocation information may be split equally into the two HE-SIG-B channels. For example, if there are N users scheduled in the MU-PPDU, then each HE-SIG-B channel can include up to $$\left\lfloor \frac{N}{2} \right\rfloor$$

per-user allocation fields where the 1 to $$\left\lfloor \frac{N}{2} \right\rfloor$$

user allocation information is carried in HE-SIG-B Channel 1 and $$\left\lfloor \frac{N}{2} \right\rfloor + 1$$

to N user allocations are carried in HE-SIG-B Channel 2. The common information signaling for MU-PPU with 484 tone RU arrangement may either be duplicated in each HE-SIG-B channel or indicated in HE-SIG-A. When signaled in HE-SIG-A, the common information is not present in HE-SIG-B channels FIG. 29 illustrates an example of HE-SIG-B multiplexing scheme 2900 for 80 MHz including 2 channels, each carrying independent information per a 20 MHz HE-SIG-B channel according to one or more embodiments of the present disclosure. The example of the HE-SIG-B multiplexing scheme 2900 illustrated in FIG. 29 is for illustration only. Other embodiments of the HE-SIG-B multiplexing scheme 2900 could be used without departing from the scope of this disclosure.

In this illustrative embodiment, the HE-SIG-B multiplexing scheme 2900 for an 80 MHz MU PPDU includes two channels 2915 and 2920 as illustrated in FIG. 29. Each HE-SIG-B channel 2915 and 2920 carries different information and the HE-SIG-B channels 2915 and 2920 are duplicated per 40 MHz i.e., HE-SIG-B Channel 1 2915 is carried in channel A & C of 80 MHz while HE-SIG-B Channel 2 2915 2920 is carried in B & D of 80 MHz as illustrated in FIG. 29. 80 MHz channel includes four 20 MHz segments identified as channels A, B, C and D in FIG. 29 and the multiplexing information used or required for decoding the PPDU for users scheduled in each of these segments have to be mapped to 2 HE-SIG-B channels duplicated per 40 MHz.

The channels A, B, C, and D may be defined as segments to refer to a granularity of subcarriers corresponding to a 242 tones RUs and can signal RU arrangements for smaller RU sizes when concatenated span the same space as the 242 tone RUs. The RU arrangement information and the per-user allocation information for segments A, B, C and D are mapped to the two HE-SIG-B channels as discussed below.

The common information portion 2905 for HE-SIG-B channel 1 2915 includes common information for segments A and C, indicates the RU arrangement up to a granularity of 242 tone RUs in the A and C segments and, and indicates the MU-MIMO resources as well as the number of users (if necessary). The common information for both segments A and C is encoded together using a convolutional code. The per-user allocation information portion 2910 follows the common portion where the per-user information for the users whose data are in the RUs of segment A are first transmitted followed by the per-user information for the users whose data are in the RUs of segment C. The numbers of per-user allocations are derived from the common information for each segment and the total number of per-user allocations is the sum of the allocations derived from the arrangement for each segment.

The common information portion 2905 for HE-SIG-B channel 2 2920 includes common information for segments B and D, indicates the RU arrangement up to a granularity of 242 tone RUs in these segments, and indicates the MU-MIMO resources as well as the number of users (if necessary). The common information for both segments B and D is encoded together using a convolutional code. The per-user allocation information follow the common information where the per-user information for the users whose data are in the RUs of segment B are first transmitted followed by the per-user information for the users whose data are in the RUs of segment D. The number of per-user allocations are derived from the common information for each segment and the total number of per-user allocations is the sum of the allocations derived from the arrangement for each segment The common information portion 2905 of one of the HE-SIG-B channels also includes 1 bit indicating whether the central 26 tone RU is assigned to an user or not. By convention, this indication may be carried in HE-SIG-B channel 1 2915 after the RU arrangements for segments are indicated and encoded together. If the bit is set to 1, the per-user allocation information is carried at the end, after the user allocations for segments A & C are carried.

The STA 111 computes the RU index of the data PPDU for a user by the position of the allocation in the segment based on the RU arrangement indicated minus the offset determined by the number of user allocations for the segments which are carried before the current segment in the same HE-SIG-B channel. For the first segment indicated, no offset needs to be computed. Duplication of HE-SIG-B channels allows for control information to remain in the 20 MHz sub-carriers closest to the data sub-carriers and allows MCS adaptation for each HE-SIG-B channel relative to the data MCS used, subject to reliability constraints.

Figure 30:
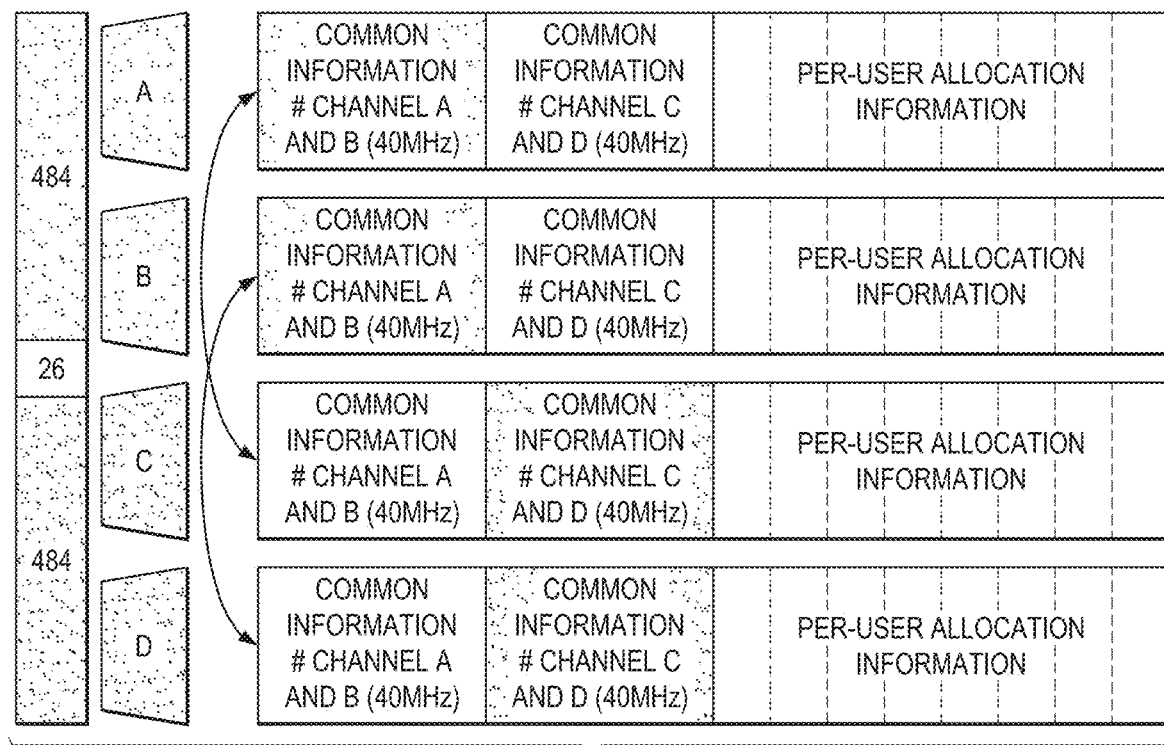
FIG. 30 illustrates an example of a scheme for keeping one format for HE-SIG-B transmissions according to one or more embodiments of the present disclosure.

Embodiments of the present disclosure recognize that the efficiency of the HE-SIG-B multiplexing scheme 2900 illustrated in FIG. 29 may not scale well for larger RU sizes (e.g., greater than 242 tone RUs) are used. Accordingly, embodiments of the present disclosure provide for modifications to maintain efficiency at larger RU sizes. FIG. 30 illustrates an example of a scheme for keeping one format for HE-SIG-B transmissions. In this illustrative example, for a 80 MHz bandwidth to signal a [484 26 484] arrangement, keeping the mapping granularity at 242 tones segments and two segments per HE-SIG-B channel results in a fully duplicated HE-SIG-B (i.e., the same information is carried in each of the HE-SIG-B channels).

Figure 31:
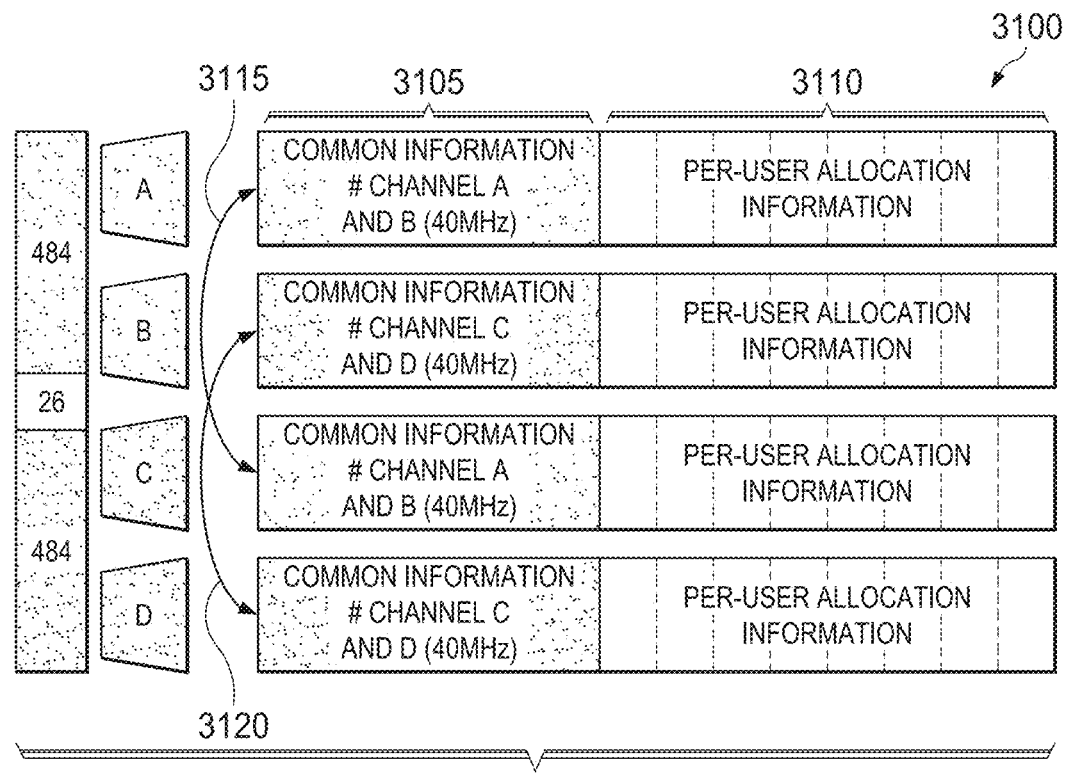
FIG. 31 illustrates an example HE-SIG-B multiplexing where larger RUs are signaled in their respective channels according to one or more embodiments of the present disclosure.

FIG. 31 illustrates an example HE-SIG-B multiplexing scheme 3100 where larger RUs are signaled in their respective channels according to one or more embodiments of the present disclosure. The example of the HE-SIG-B multiplexing scheme 3100 illustrated in FIG. 31 is for illustration only. Other embodiments of the HE-SIG-B multiplexing scheme 3100 could be used without departing from the scope of this disclosure.

In this embodiment, the HE-SIG-B multiplexing scheme 3100 provides an efficient approach to keep the information distinct in the two HE-SIG-B channels 3115 and 3120 by making the mapping granularity flexible and tuned to the RU size being signaled. The information for larger RUs sizes is carried by signaling the mapping granularity per HE-SIG-B channel and is based on the RU size used in the MU-PPDU. A redefined segment definition is carried prior to the HE-SIG-B decoding. For example, when 2 484 tone RUs are signaled in MU PPDU, the RU arrangement in 80 MHz is [484 26 484], then the common information for channels A & B, that span the 484 tone RU is carried in HE-SIG-B channel 1 3115 while the common information for channels C & D that span the 484 tone RU is carried in HE-SIG-B channel 2 3120 as illustrated in FIG. 31. The per-user allocation information portion 3110 follows the common information portion 3105 and carries the information for users scheduled in the segment for each channels. The HE-SIG-B channels 3115 and 3120 are duplicated per 40 MHz. The common information portion 3105 of one of the HE-SIG-B channels 3115 or 3120 also includes 1 bit indicating whether the central 26 tone RU is assigned to an user or not. By convention, this indication may be carried in HE-SIG-B channel-1 3115 after the RU arrangements for the 484 tone RU is indicated and encoded together. If the bit is set to 1, the per-user allocation information is carried at the end, after the user allocations assigned to the 484 tone RU are carried.

Since the amount of common information changes between example multiplexing schemes illustrated in FIG. 29 and FIG. 31. The receivers in the STAs need to know the number of bits in the common information to prepare for decoding and therefore this change in the common information is signaled prior to HE-SIG-B decoding.

The embodiments discussed below describe certain example scenarios that benefit from redefining segment mapping granularity. For each of the scenarios described below, the amount of the common information in each HE-SIG-B channel changes and is signaled before the HE-SIG-B decoding.

Figure 32:
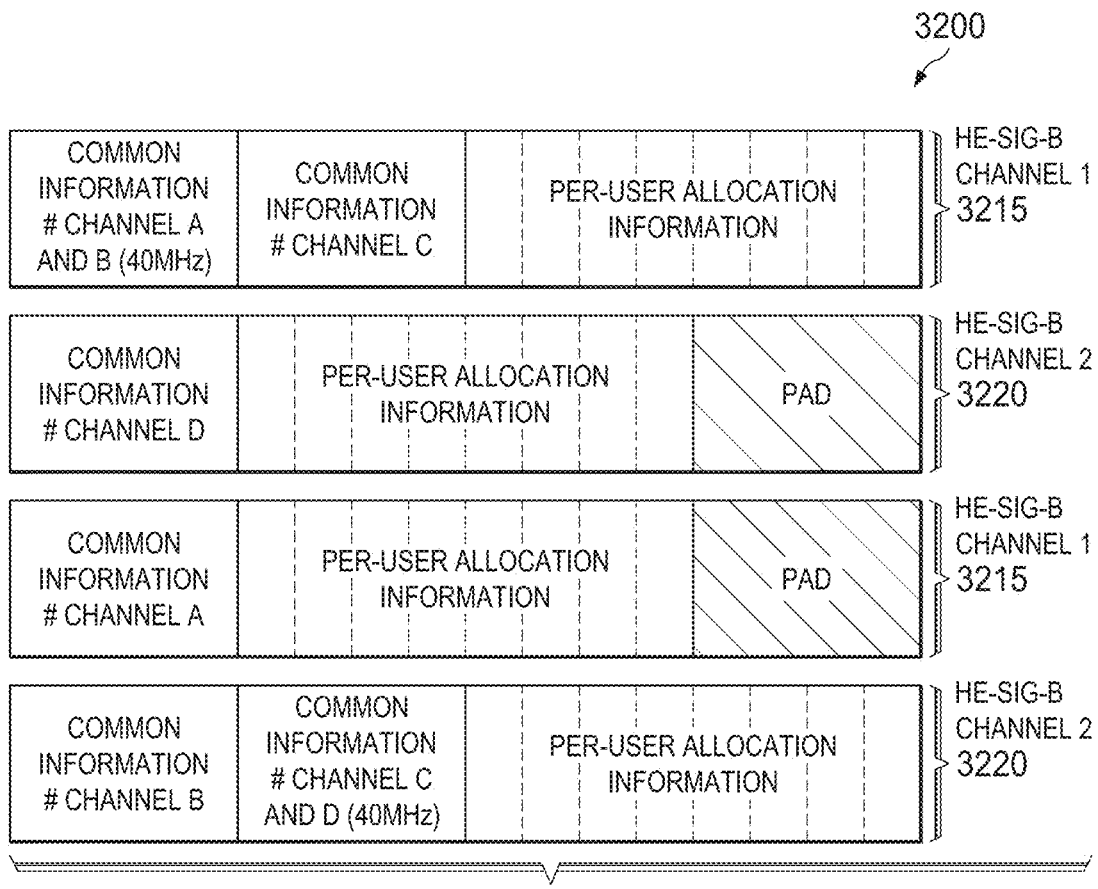
FIG. 32 illustrates an example HE-SIG-B multiplexing scheme in 80 MHz when only one of the channels has a 484 tone RU multiplexed according to one or more embodiments of the present disclosure.

FIG. 32 illustrates an example HE-SIG-B multiplexing scheme 3200 in 80 MHz when only one of the channels has a 484 tone RU multiplexed according to one or more embodiments of the present disclosure. The example of the HE-SIG-B multiplexing scheme 3200 illustrated in FIG. 32 is for illustration only. Other embodiments of the HE-SIG-B multiplexing scheme 3200 could be used without departing from the scope of this disclosure. In this illustrative embodiment, one 484 tone RU being present in a 80 MHz PPDU results in two different mapping strategies for the HE-SIG-B channels 3215 and 3220.

Figure 33:
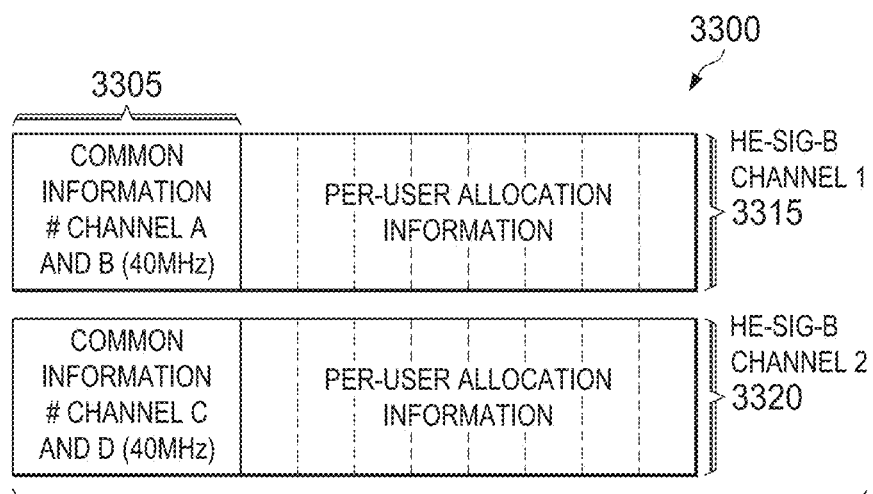
FIG. 33 illustrates an example HE-SIG-B multiplexing scheme when both channels indicate 40 MHz transmissions according to one or more embodiments of the present disclosure.

FIG. 33 illustrates an example HE-SIG-B multiplexing scheme 3300 when both channels indicate 40 MHz transmissions according to one or more embodiments of the present disclosure. The example of the HE-SIG-B multiplexing scheme 3300 illustrated in FIG. 33 is for illustration only. Other embodiments of the HE-SIG-B multiplexing scheme 3300 could be used without departing from the scope of this disclosure. In this illustrative embodiment, two 484 tone RUs appearing in a 80 MHz PPDU results in a compact common information portion 3305 for the HE-SIG-B channels 3315 and 3320.

Figure 34:
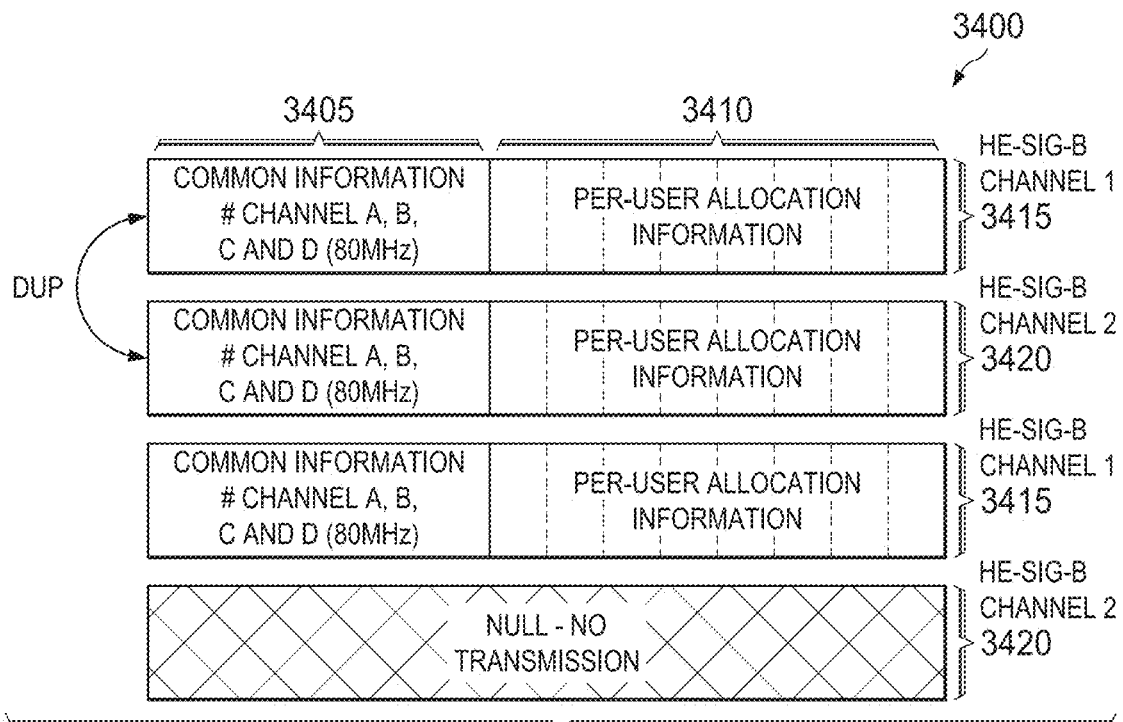
FIG. 34 illustrates an example HE-SIG-B multiplexing scheme when a single 996 tone RU is indicated for 80 MHz according to one or more embodiments of the present disclosure.

FIG. 34 illustrates an example HE-SIG-B multiplexing scheme 3400 when a single 996 tone RU is indicated for 80 MHz according to one or more embodiments of the present disclosure. The example of the HE-SIG-B multiplexing scheme 3400 illustrated in FIG. 34 is for illustration only.

Other embodiments of the HE-SIG-B multiplexing scheme 3400 could be used without departing from the scope of this disclosure. In this illustrative embodiment, one 996 tone RU appearing in a 80 MHz PPDU results in only one HE-SIG-B channel 3415 carrying unique information indicating an RU arrangement of 996 tones and the per-user signaling information portion 3410 following the RU arrangement indication in the common portion. This information can be carried in HE-SIG-B channel 1 3415 and duplicated in HE-SIG-B channel 2 3420 as illustrated in FIG. 34 and duplicated in the other 40 MHz (i.e., HE-SIG-B is duplicated completely over the 80 MHz). In another example, also illustrated in FIG. 34, the AP 101 only transmits information in HE-SIG-B channel 1 3415 and does not transmit in HE-SIG-B channel 2 3420. Over 80 MHz, HE-SIG-B is duplicated in only channels A & C while channels B & D are left empty. Only one of these two example configuration may need to be supported or implemented.

Various embodiments of the present disclosure provide multiplexing options for HE-SIG-B to support load balancing. There are scenarios where allowing flexibility in mapping the four segment decoding information to the HE-SIG-B channel allows for a balanced load between the two HE-SIG-B channels and reduces the need for padding in either channel for symbol alignment. This need is likely to be acute when asymmetric distribution of RUs and users between the segments A, B, C & D occur. The flexibility depends on the segment size considered and the associated mapping rule.

Figure 35:
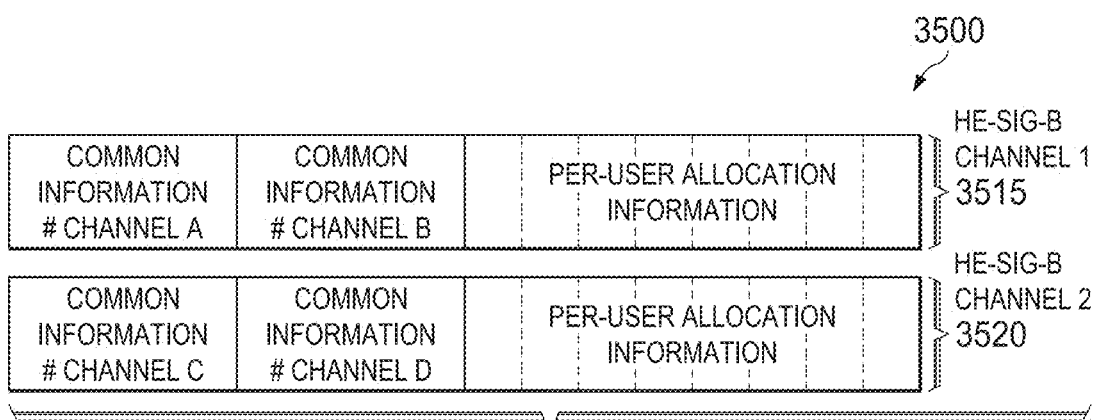
FIG. 35 illustrates an example HE-SIG-B multiplexing scheme that supports load balancing when multiple RUs are indicated according to one or more embodiments of the present disclosure.

FIG. 35 illustrates an example HE-SIG-B multiplexing scheme 3500 that supports load balancing when multiple RUs are indicated according to one or more embodiments of the present disclosure. The example of the HE-SIG-B multiplexing scheme 3500 illustrated in FIG. 35 is for illustration only. Other embodiments of the HE-SIG-B multiplexing scheme 3500 could be used without departing from the scope of this disclosure.

In this illustrative embodiment, the example scenarios of mapping to the segments to HE-SIG-B channels are also supported by an indication before the STA 111 begins decoding HE-SIG-B. When four 242 tone RU segments are indicated for 80 MHz, common and per-user information portions 3505 and 3510 for segments A and B are multiplexed together in HE-SIG-B channel 1 3515 and common and per-user information for segments C and D is multiplexed together in HE-SIG-B channel 2 3520 as illustrated in FIG. 35. This re-arrangement of segment mapping is supported in addition to the mapping discussed above with regard to FIG. 29. During scheduling, depending on the RU arrangement and the number of users in each segment, the AP 101 decides the option that minimizes or reduces the padding overhead in either HE-SIG-B channel for symbol alignment. When one 484 tone RU segment is indicated for 80 MHz, the common information is multiplexed using two additional cases similar to the ones illustrated in FIG. 32. Different combinations of the segments to HE-SIG-B channel mapping may also be used. For example, the channels A, B, C are mapped to HE-SIG-B Channel 1 while D is mapped to HE-SIG-B Channel 2. Non-contiguous channel bonding support may be provided when no preamble and data is transmitted in at least one 20 MHz secondary channel.

The AP 101 may also include a HE-SIG-B multiplexing format field to signal the multiplexing format. Two reasons motivate or necessitate indicating a multiplexing format prior to HE-SIG-B decoding. First, indicating a multiplexing format provides for efficient signaling when larger RU sizes are used in an 80 MHz PPDU. For example, at least three scenarios with 484 tone RU in either or both HE-SIG-B channels and one scenario with 996 tone RU in HE-SIG-B channel benefit from prior indication of a multiplexing format as discussed above. Second, indicating a multiplexing format provides for load balancing. For example, at least a scenario with four 242 tone segments are to be signaled with asymmetric user distribution in each segment, two scenarios where at least one 484 tone segment is to be signaled, and specific configurations of segments to HE-SIG-B channel mapping benefits from prior indication of a multiplexing format. Together with the scenario illustrated in FIG. 29, eight scenarios change the multiplexing format and content in either HE-SIG-B channels. A total of 3 signaling bits are used for 80 MHz and the multiplexing format is indicated to the STA 111 before HE-SIG-B decoding.

FIG. 36 illustrates example HE-SIG-B multiplexing schemes 3600 utilizing a HE-SIG-B multiplexing format field 3602 indicating how common information is arranged in HE-SIG-B channels according to one or more embodiments of the present disclosure. The example of the HE-SIG-B multiplexing schemes 3600 illustrated in FIG. 36 is for illustration only. Other embodiments of the HE-SIG-B multiplexing schemes 3600 could be used without departing from the scope of this disclosure.

In this illustrative embodiment, the HE-SIG-B multiplexing format fields 3602 indicates how information of the four segments in the common information portion 3605 is mapped to the two HE-SIG-B channels 3615 and 3620. The HE-SIG-B multiplexing format field 3602 is 3 bits for an 80 MHz PPDU and the value of the 3 bits indicates how the segments are mapped to the two HE-SIG-B channels 3615 and 3620. The HE-SIG-B multiplexing format field 3602 is carried in HE-SIG-A. In general, HE-SIG-B format field 3602 is made up of N bits that are used to signal how common information is arranged, load balancing is supported and other optimizations including the lack of common information in HE-SIG-B for a MU-MIMO PPDU over the full bandwidths, in which case, the number of users is indicated in HE-SIG-B format field to be carried in HE-SIG-A.

In one embodiment, when 484 tone RU or larger size RU is scheduled in 80 MHz PPDU, the per-user allocation information is divided among the two HE-SIG-B channels 3615 and 3620. For example, if a 484 tone RU is scheduled for segments A and B and there are N users scheduled in the MU-PPDU, then each HE-SIG-B channel can include up to $$\left\lfloor \frac{N}{2} \right\rfloor$$

per-user allocation fields where the 1 to $$\left\lfloor \frac{N}{2} \right\rfloor$$

user allocation information is carried in HE-SIG-B Channel 1 and $$\left\lfloor \frac{N}{2} \right\rfloor + 1$$

to $$\left\lfloor \frac{N}{2} \right\rfloor$$

user allocations are carried in HE-SIG-B Channel 2. If a 484 tone RU is scheduled for segments B and C, there are N users scheduled in the MU-PPDU, then each HE-SIG-B channel can include up to $$\left\lfloor \frac{N}{2} \right\rfloor$$

per-user allocation fields where the 1 to $$\left\lfloor \frac{N}{2} \right\rfloor$$

user allocation information is carried in HE-SIG-B Channel 2 and $$\left\lfloor \frac{N}{2} \right\rfloor + 1$$

to $$\left\lfloor \frac{N}{2} \right\rfloor$$

user allocations are carried in HE-SIG-B Channel 1. When the per-user allocation field spills over the HE-SIG-B channels, the user allocation information for RU arrangement indicated in the common field of the HE-SIG-B channel is first carried followed by per user allocation information that is distributed from the other channel.

Generally, for larger size RUs that span multiple HE-SIG-B channels, the per user allocation information for the users scheduled in the RU is split equitably among the HE-SIG-B channels. For M HE-SIG-B channels and N users, $$\left\lfloor \frac{N}{M} \right\rfloor$$

users are carried in every HE-SIG-B channel that the RU allocation spans with any extra users carried in the last channel.

Figure 37:
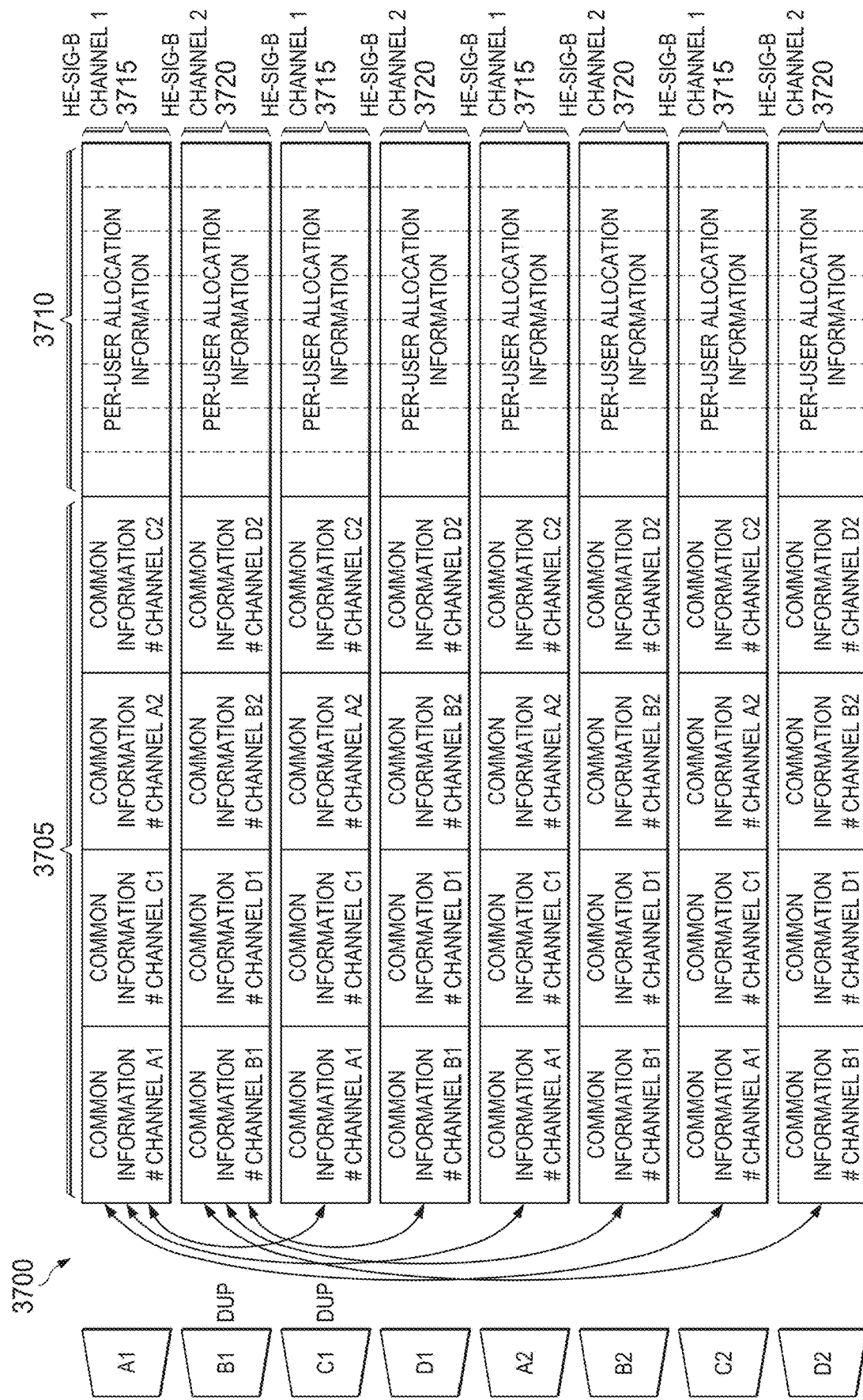
FIG. 37 illustrates an example channel structure and duplication scheme for multiplexing control information in HE-SIG-B for 160 MHz according to one or more embodiments of the present disclosure.

FIG. 37 illustrates an example channel structure and duplication scheme 3700 for multiplexing control information in HE-SIG-B for 160 MHz according to one or more embodiments of the present disclosure. The example of the HE channel structure and duplication scheme 3700 illustrated in FIG. 37 is for illustration only. Other embodiments of the channel structure and duplication scheme 3700 could be used without departing from the scope of this disclosure.

Various embodiments of the present disclosure provide for extending multiplexing support to a 160 MHz bandwidth allocation. In this illustrative embodiment, eight 20 MHz segments are mapped to 2 HE-SIG-B channels 3715 and 3720 that are duplicated per 40 MHz for a MU PPDU that spans 160 MHz. The 160 MHz tone plan is built as two concatenated 80 MHz tone plans that are not aligned with 20 MHz segments. Redefining channels A1, B1, C1, D1, A2, B2, C2 and D2 as segments in FIG. 36 to refer to a granularity of subcarriers corresponding to a 242 tones RUs and signal RU arrangements for smaller RU sizes when concatenated span the same space as the 242 tone RUs. The common information portion 3705 for HE-SIG-B channel 1 3715 includes common information for segments A1, C1, A2 and C2 that indicates the RU arrangement up to a granularity of 242 tone RUs in the said segments and the MU-MIMO resources as well as the number of users (if necessary). The common information portion 3705 for segments A1, C1, A2 and C2 are encoded together using a convolutional code. The per-user allocation information portion 3710 follows the common portion where the per-user information for the users whose data are in the RUs of segment A1 are first transmitted followed by the per-user information for the users whose data are in the RUs of segment C1 and then by A2 and C2. The numbers of per-user allocations are derived from the common information for each segment and the total number of per-user allocations is the sum of the allocations derived from the arrangement for each segment.

The common information portion for HE-SIG-B channel 2 3720 includes common information for segments B1, D1, B2, and D2 that indicates the RU arrangement up to a granularity of 242 tone RUs in the said segments and the MU-MIMO resources as well as the number of users (if necessary). The common information portion 3705 for both segments B 1, D1, B2, and D2 are encoded together using a convolutional code. The per-user allocation information portion 3710 follows the common portion where the per-user information for the users whose data are in the RUs of segment B1 are first transmitted followed by the per-user information for the users whose data are in the RUs of segment D1 and then by those of B2 and D2. The number of per-user allocations is derived from the common information for each segment and the total number of per-user allocations is the sum of the allocations derived from the arrangement for each segment.

Two 26 tone RUs are signaled using 1 bit separately. By convention, one in HE-SIG-B channel-1 3715 and the other in HE-SIG-B channel-2 3720. The common information portion 3705 in each of the HE-SIG-B channels 3715 and 3720 also includes 1 bit indicated if the central 26 tone RU is assigned to an user or not. By convention, this indication may be carried in HE-SIG-B channel-1 3715 after the RU arrangements for segments are indicated and encoded together. If the bit is set to 1, the per-user allocation information is carried at the end, after the user allocations for other segments are carried.

Embodiments of the present disclosure recognize that the use of larger RUs of size greater than 242 tone RU may result in inefficiencies similar those discussed above for the 80 MHz bandwidth allocations. An efficient approach is to keep the information distinct in the two HE-SIG-B channels by making the mapping granularity flexible and tuned to the RU size being signaled. In an embodiment of the present disclosure, the information for larger RUs sizes is carried by signaling the mapping granularity per HE-SIG-B channel and is based on the RU size used in the MU-PPDU. A redefined segment definition is carried prior to the HE-SIG-B decoding. Given the bandwidth size, there are a large number of multiplexing formats given the size. For example, 25 different cases, as illustrated in Table 4 below, have a multiplexing format to be signaled. Five signaling bits are used by the AP 101 to indicate all multiplexing formats in the HE-SIG-B multiplexing format field in HE-SIG-A for 160 MHz.

TABLE 4

Cases that the common information changes for HE-SIG-B channels when 160 MHz bandwidth is indicated

| RU used in 160 MHz PPDU | Cases |
|---|---|
| 1 484 tone RU | 4 cases |
| 2 484 tone RUs | 6 cases |
| 3 484 tone RUs | 4 cases |
| 4 484 tone RUs | 1 case |
| 1 996 tone RU | 2 cases |
| 1 996 tone RU and 1 484 tone RU | 4 cases |
| 1 996 tone RU and 2 484 tone RUs | 2 cases |
| 2 996 tone RUs | 1 case |
| 1 2 × 996 tone RU | 1 cases |

In an embodiment of the present disclosure, the HE-SIG-B multiplexing format field is a fixed size irrespective of the bandwidth of the MU PPDU and is signaled in HE-SIG-A. In an embodiment of the present disclosure, the HE-SIG-B multiplexing format is derived by the STA 111 by blind decoding the common information section with different size hypothesis. The common information section for each section can have N sizes. The STA 111 tries decoding code blocks corresponding to each size and only uses the information for which the CRC passes.

Figure 38:
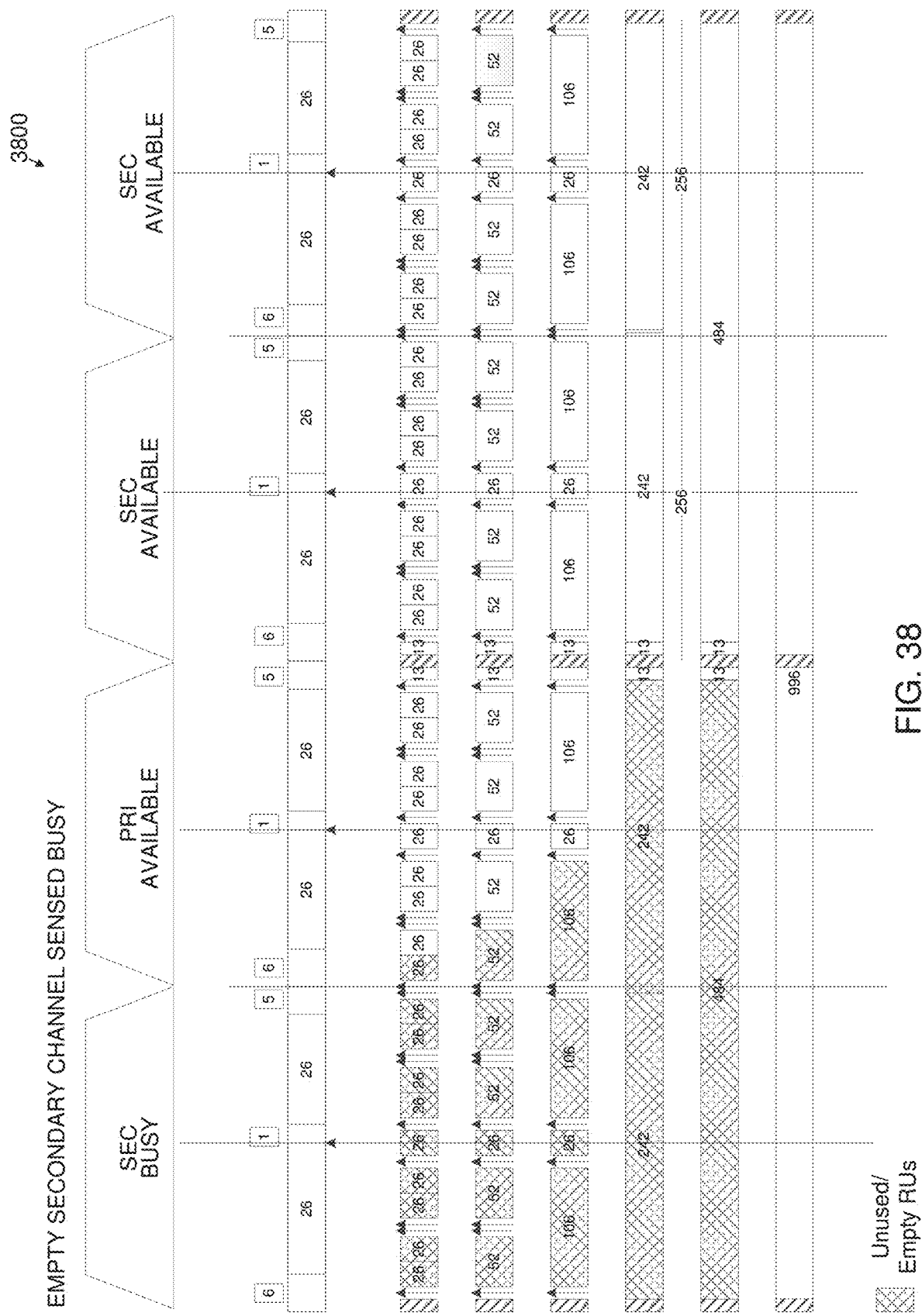
FIG. 38 illustrates an example of RU nulling for non-contiguous channel bonding according to one or more embodiments of the present disclosure.
Figure 39:
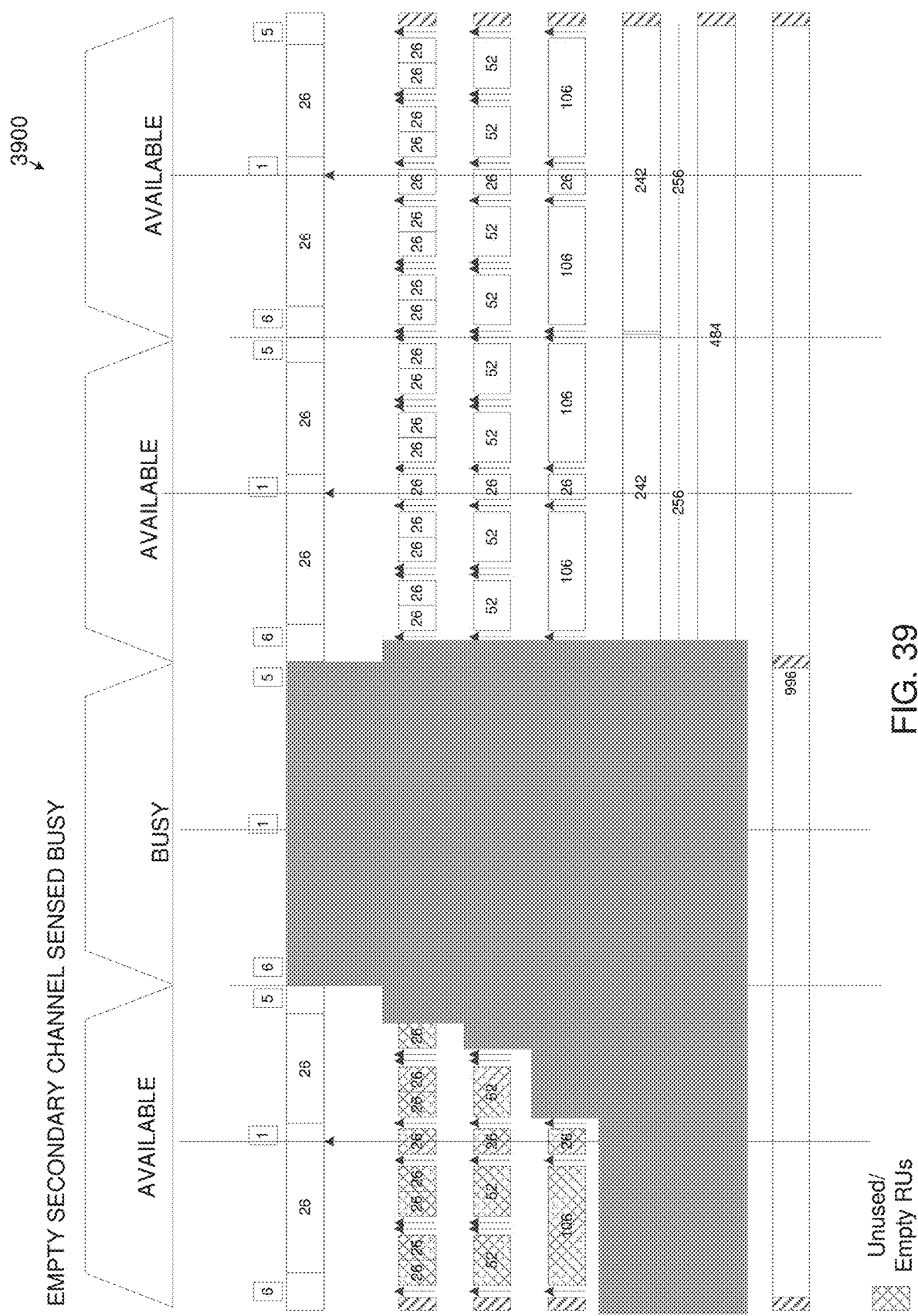
FIG. 39 illustrates an example of RU nulling when a channel on the inside is nulled using non-contiguous channel bonding according to one or more embodiments of the present disclosure.
Figure 40:
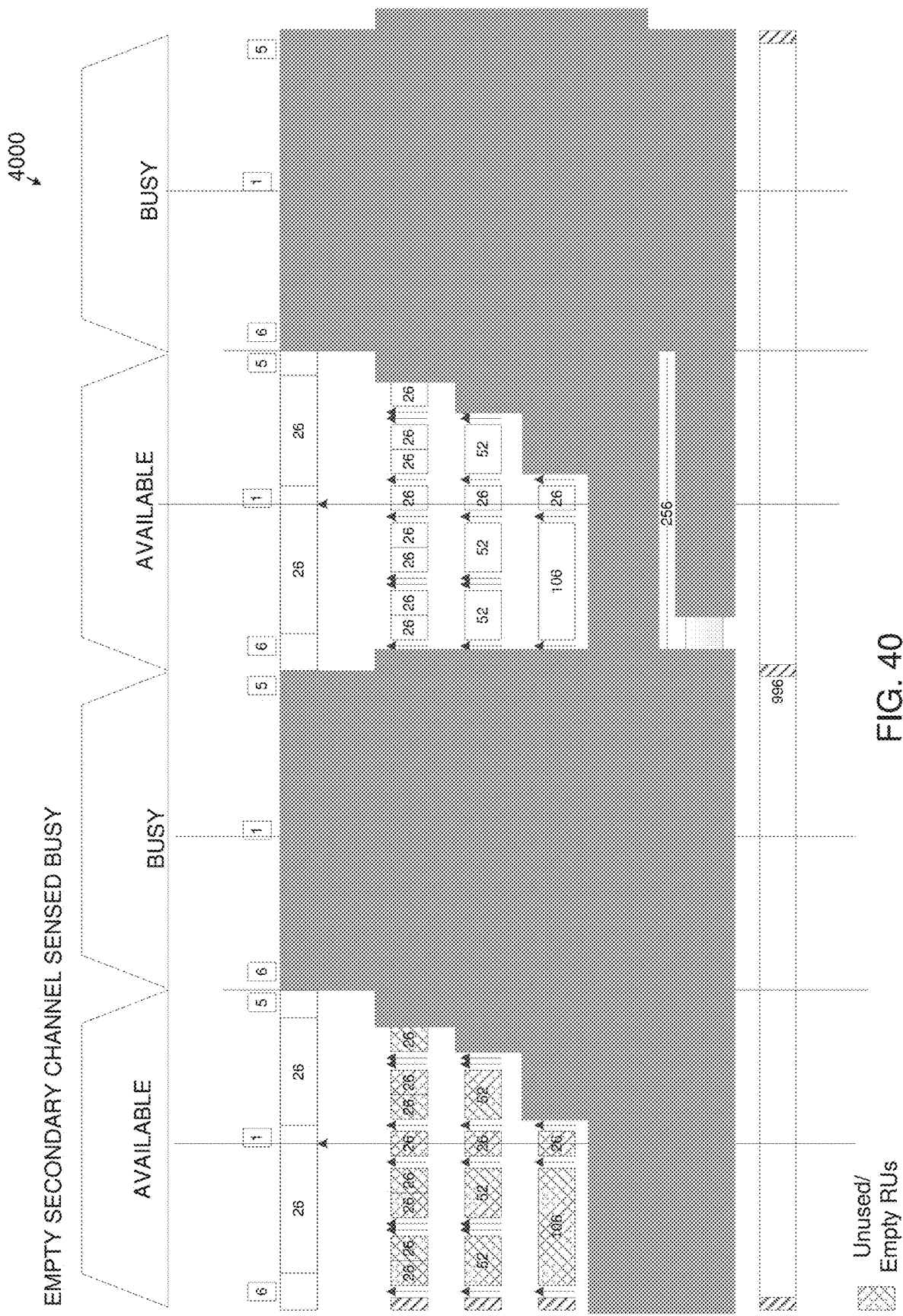
FIG. 40 illustrates an example RU nulling when two channels are nulled according to one or more embodiments of the present disclosure.

FIG. 38 illustrates an example of RU nulling 3800 for non-contiguous channel bonding according to one or more embodiments of the present disclosure, FIG. 39 illustrates an example of RU nulling 3900 when a channel on the inside is nulled using non-contiguous channel bonding according to one or more embodiments of the present disclosure, and FIG. 40 illustrates an example of RU nulling 4000 when two channels are nulled according to one or more embodiments of the present disclosure. The example of RU nulling 3800, 3900, and 4000 illustrated in FIGS. 38-40 is for illustration only. Other examples of RU nulling could be used without departing from the scope of this disclosure.

In these illustrative embodiments, when non-contiguous channel bonding is indicated in HE-SIG-A or a prior request to transmit(RTS)/clear to transmit(CTS) transaction, the edge RUs of the channels adjacent to the channels being nulled do not carry any information and no per-STA information fields are carried for those RUs. Even if the RU arrangement indicates the presence or use of an RU, the presence of per-STA information fields is determined based on whether the non-contiguous channel bonding field is set to indicate certain unused channels. For example, if one secondary (SEC) channel is unused, the primary (PRI) channel adjacent to the secondary channel as illustrated in FIG. 38 will not use the edge RU. Depending on the arrangement, a 26 tone RU at the edge may be unused or a 52 tone edge RU may be nulled. For different channels being nulled, the common information including the RU arrangement may not be carried. For those channels that carry data, common control and per-user signaling fields are mapped to their respective HE-SIG-B channels as per the mapping rules. Different types of channel bonding can be supported as illustrated in FIGS. 38-40.

Figure 41:
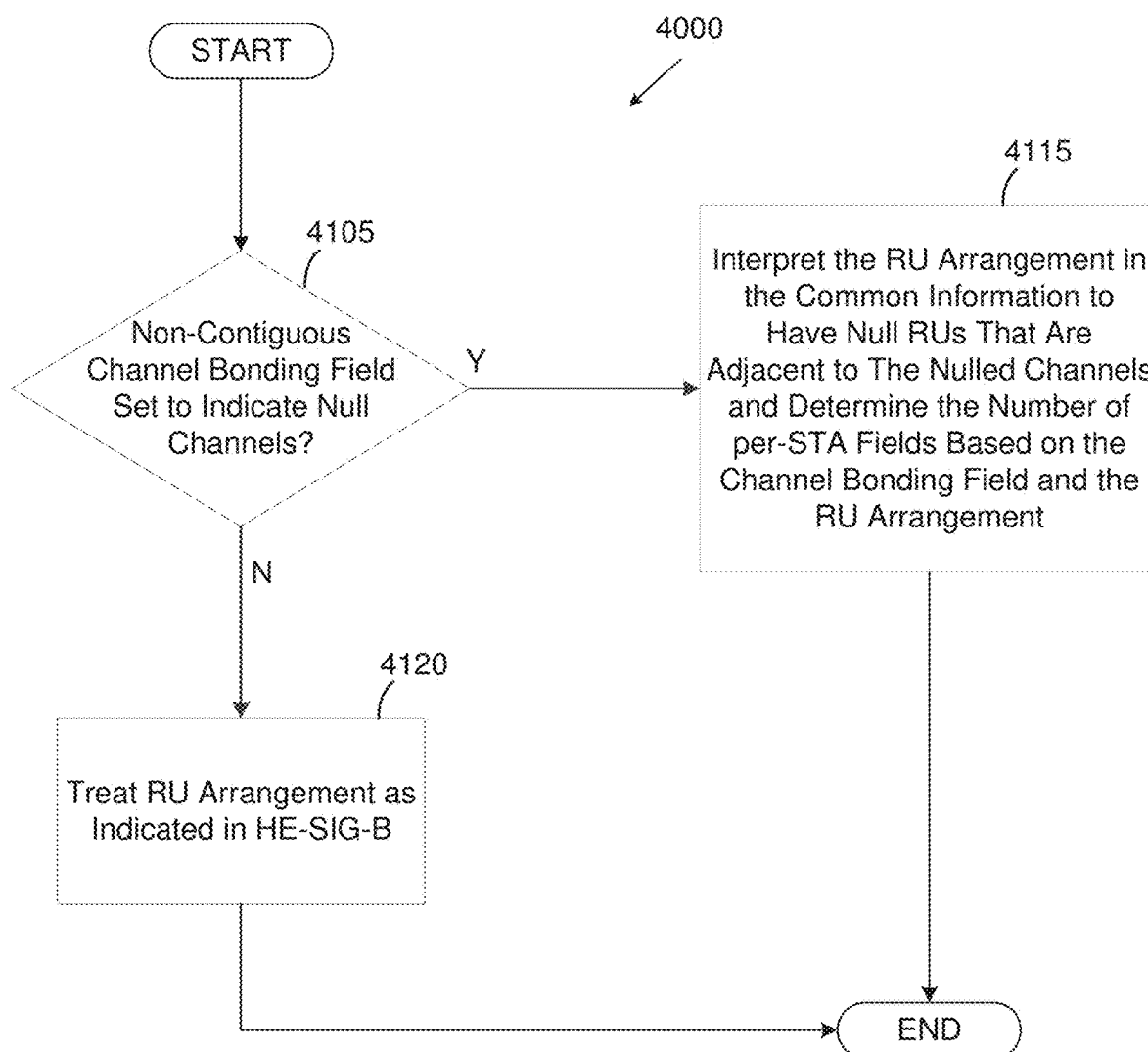
FIG. 41 illustrates an example process for interpreting an RU arrangement by an STA when non-contiguous channel bonding is used according to one or more embodiments of the present disclosure.

FIG. 41 illustrates an example process 4100 for interpreting an RU arrangement by an STA 111 when non-contiguous channel bonding is used according to one or more embodiments of the present disclosure. For example, the process may be performed by the STA 111 based on signaling from the AP 101. The example process 4100 illustrated in FIG. 41 is for illustration only. Other embodiments of the process 4100 could be used without departing from the scope of this disclosure.

In this illustrative embodiment, depending on the nulling indicated in HE-SIG-A, the RU arrangement for the channels that carry data indicates where the data are carried and the edge RUs that need to be ignored. The process begins with the STA 111 determining whether a non-contiguous channel bonding field is set to indicate null channels (step 4105). For example, in step 4105, the STA 111 may identify the non-contiguous channel bonding field from the HE-SIG-A field in a packet header, such as the packet header 300 in FIG. 3.

If the STA 111 determines that the non-contiguous channel bonding field is set to indicate null channels, the STA 111 then interprets the RU arrangement in the common information portion to have null RUs that are adjacent to the nulled channels and determines the number of per-STA fields based on the channel bonding field and the RU arrangement (step 4110). For example, in step 4110, the STA 111 may interpret the null RUs as discussed above with regard to FIGS. 38-40.

If, however, the STA 111 determines that the non-contiguous channel bonding field is not set to indicate null channels, the STA 111 then treats RU arrangement as indicated in HE-SIG-B (step 4115). For example, in step 4115, the STA 111 process the information in the HE-SIG-B channel as discussed above without nulled channels.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus of a station (STA) in a wireless local area network (WLAN), the apparatus configured to:
   receive a protocol data unit associated with a plurality of resource units (RUs) of data,
   identify a common field for STAs of a content channel in the protocol data unit, wherein the common field includes information on RU allocation indicating an arrangement of the RUs in a frequency domain and a number of multi-user multiple-input multiple-output (MU-MIMO) users in an MU-MIMO resource, and
   identify user-specific information corresponding to the STA from a user-specific field of the content channel in the protocol data unit, wherein the user-specific field follows the common field.

2. The apparatus of claim 1, wherein:
   the user-specific field includes a plurality of user fields corresponding to the STAs, and
   each of the plurality of user fields includes user-specific information corresponding to a STA.

3. The apparatus of claim 1, wherein a plurality of bits of the common field are used for the RU allocation.

4. The apparatus of claim 1, wherein the user-specific information includes information which is used to decode the protocol data unit for the STA.

5. The apparatus of claim 1, wherein the user-specific information includes information of a modulation and coding scheme (MCS), information for indicating Low Density Parity Check (LDPC) coding, and information indicating a number of spatial streams.

6. The apparatus of claim 1, wherein:
the content channel and another content channel are included in the protocol data unit being an 80 MHz physical layer protocol data unit (PPDU), and
each of the content channel and another content channel is duplicated per a 20 MHz.

7. The apparatus of claim 1, wherein a RU corresponding to the STA is indicated based on the information on the RU allocation and the user-specific field.

8. The apparatus of claim 1, wherein the content channel is included in a high efficiency signal B (HE-SIG-B) field in the protocol data unit.

9. An apparatus of an access point (AP) in a wireless local area network (WLAN), the apparatus configured to;
generate a protocol data unit associated with a plurality of resource units (RUs) of data, wherein a content channel in the protocol data unit includes a common field for stations (STAs) and a user-specific field,
wherein the common field includes information on RU allocation indicating an arrangement of the RUs in a frequency domain and a number of multi-user multiple-input multiple-output (MU-MIMO) users in an MU-MIMO resource,
wherein the user-specific field of the content channel in the protocol data unit includes user-specific information corresponding to a STA of the STAs, and
wherein the user-specific field follows the common field; and
transmit the protocol data unit.

10. The apparatus of claim 9, wherein:
the user-specific field includes a plurality of user fields corresponding to the STAs, and
each of the plurality of user fields includes user-specific information corresponding to a STA.

11. The apparatus of claim 9, wherein a plurality of bits of the common field are used for the RU allocation.

12. The apparatus of claim 9, wherein the user-specific information includes information which is used to decode the protocol data unit for the STA.

13. The apparatus of claim 9, wherein the user-specific information includes information of a modulation and coding scheme (MCS), information for indicating Low Density Parity Check (LDPC) coding, and information indicating a number of spatial streams.

14. The apparatus of claim 9, wherein:
the content channel and another content channel are included in the protocol data unit being an 80 MHz physical layer protocol data unit (PPDU), and
each of the content channel and another content channel is duplicated per a 20 MHz.

15. The apparatus of claim 9, wherein a RU corresponding to the STA is indicated based on the information on the RU allocation and the user-specific field.

16. The apparatus of claim 9, wherein the content channel is included in a high efficiency signal B (HE-SIG-B) field in the protocol data unit.

17. A method performed by a station (STA) in a wireless local area network (WLAN), the method comprising:
receiving a protocol data unit associated with a plurality of resource units (RUs) of data;
identifying a common field for STAs of a content channel in the protocol data unit, wherein the common field includes information on RU allocation indicating an arrangement of the RUs in a frequency domain and a number of multi-user multiple-input multiple-output (MU-MIMO) users in an MU-MIMO resource; and
identifying user-specific information corresponding to the STA from a user-specific field of the content channel in the protocol data unit, wherein the user-specific field follows the common field.

18. The method of claim 17, wherein:
the user-specific field includes a plurality of user fields corresponding to the STAs, and
each of the plurality of user fields includes user-specific information corresponding to a STA.

19. The method of claim 17, wherein a plurality of bits of the common field are used for the RU allocation.

20. The method of claim 17, wherein the user-specific information includes information which is used to decode the protocol data unit for the STA.

21. The method of claim 17, wherein the user-specific information includes information of a modulation and coding scheme (MCS), information for indicating Low Density Parity Check (LDPC) coding, and information indicating a number of spatial streams.

22. The method of claim 17, wherein:
the content channel and another content channel are included in the protocol data unit being an 80 MHz physical layer protocol data unit (PPDU), and
each of the content channel and another content channel is duplicated per a 20 MHz.

23. The method of claim 17, wherein a RU corresponding to the STA is indicated based on the information on the RU allocation and the user-specific field.

24. The method of claim 17, wherein the content channel is included in a high efficiency signal B (HE-SIG-B) field in the protocol data unit.

25. A method performed by an access point (AP) in a wireless local area network (WLAN), the method comprising:
generating a protocol data unit associated with a plurality of resource units (RUs) of data, wherein a content channel in the protocol data unit includes a common field for stations (STAs) and a user-specific field,
wherein the common field includes information on RU allocation indicating an arrangement of the RUs in a frequency domain and a number of multi-user multiple-input multiple-output (MU-MIMO) users in an MU-MIMO resource,
wherein the user-specific field of the content channel in the protocol data unit includes user-specific information corresponding to a STA of the STAs, and
wherein the user-specific field follows the common field; and
transmitting the protocol data unit.

26. The method of claim 25, wherein:
the user-specific field includes a plurality of user fields corresponding to the STAs, and
each of the plurality of user fields includes user-specific information corresponding to a STA.

27. The method of claim 25, wherein a plurality of bits of the common field are used for the RU allocation.

28. The method of claim 25, wherein the user-specific information includes information which is used to decode the protocol data unit for the STA.

29. The method of claim 25, wherein the user-specific information includes information of a modulation and coding scheme (MCS), information for indicating Low Density Parity Check (LDPC) coding, and information indicating a number of spatial streams.

30. The method of claim 25, wherein:
the content channel and another content channel are included in the protocol data unit being an 80 MHz physical layer protocol data unit (PPDU), and
each of the content channel and another content channel is duplicated per a 20 MHz.

31. The method of claim 25, wherein a RU corresponding to the STA is indicated based on the information on the RU allocation and the user-specific field.

32. The method of claim 25, wherein the content channel is included in a high efficiency signal B (HE-SIG-B) field in the protocol data unit.

* * * * *